(12) United States Patent
Kang

(10) Patent No.: US 10,095,787 B2
(45) Date of Patent: Oct. 9, 2018

(54) MOBILE TERMINAL AND METHOD FOR CONTROLLING THE SAME

(71) Applicant: LG ELECTRONICS INC., Seoul (KR)

(72) Inventor: Haksoo Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 404 days.

(21) Appl. No.: 14/807,126

(22) Filed: Jul. 23, 2015

(65) Prior Publication Data

US 2016/0034574 A1 Feb. 4, 2016

(30) Foreign Application Priority Data

Jul. 29, 2014 (KR) .................. 10-2014-0096150

(51) Int. Cl.
*G06F 17/30* (2006.01)
*H04N 5/76* (2006.01)
(Continued)

(52) U.S. Cl.
CPC ...... *G06F 17/30858* (2013.01); *G06F 3/0482* (2013.01); *G06F 3/04842* (2013.01);
(Continued)

(58) Field of Classification Search
CPC ......... H04N 21/4325; H04N 21/26258; H04N 21/8549; H04N 21/4316; H04N 21/4438;
(Continued)

(56) References Cited

U.S. PATENT DOCUMENTS

2005/0069286 A1* 3/2005 Miyashita ............ G11B 27/105
386/240
2008/0022205 A1* 1/2008 Shinkai ................ G11B 27/034
715/723
(Continued)

FOREIGN PATENT DOCUMENTS

EP 1971134 9/2008
EP 2693727 2/2014

OTHER PUBLICATIONS

European Patent Office Application Serial No. 15178306.5, Search Report dated Jan. 25, 2016, 13 pages.
(Continued)

*Primary Examiner* — Tadeese Hailu
(74) *Attorney, Agent, or Firm* — Lee Hong Degerman Kang & Waimey

(57) ABSTRACT

A mobile terminal includes a display and controller configured to cause the display to display a playback screen of a first multimedia file and cause the display to display a first retrieval screen in response to receiving a first user input during the displaying of the playback screen of the first multimedia file, such that the first retrieval screen includes a plurality of thumbnail images respectively corresponding to one of a plurality of playback points in time on a per first time interval basis of the first multimedia file. The controller also causes the display to play the first multimedia file beginning at a playback point in time that corresponds to a selected one of the plurality of thumbnail images.

18 Claims, 51 Drawing Sheets

(51) Int. Cl.
  *H04N 21/482*   (2011.01)
  *G06F 3/0482*   (2013.01)
  *G06F 3/0484*   (2013.01)
  *G11B 27/10*   (2006.01)
  *G11B 27/30*   (2006.01)
  *H04N 21/414*   (2011.01)
  *H04N 21/431*   (2011.01)
  *H04N 21/443*   (2011.01)
  *H04N 21/472*   (2011.01)
  *H04N 21/485*   (2011.01)
  *H04M 1/725*   (2006.01)
  *H04N 5/445*   (2011.01)
  *H04N 21/422*   (2011.01)

(52) U.S. Cl.
  CPC .... *G06F 3/04847* (2013.01); *G06F 17/30823* (2013.01); *G11B 27/102* (2013.01); *G11B 27/3081* (2013.01); *H04M 1/72522* (2013.01); *H04N 5/44543* (2013.01); *H04N 5/76* (2013.01); *H04N 21/41407* (2013.01); *H04N 21/4316* (2013.01); *H04N 21/4438* (2013.01); *H04N 21/47217* (2013.01); *H04N 21/482* (2013.01); *H04N 21/4825* (2013.01); *H04N 21/4858* (2013.01); *H04N 21/42224* (2013.01); *H04N 2005/44556* (2013.01)

(58) Field of Classification Search
  CPC ............. H04N 21/482; H04N 21/4858; H04N 21/42224; H04N 21/41407; G06F 17/30852; G06F 17/3079; G06F 17/30817; G06F 17/30849; G06F 17/30858; G06F 17/30823; H04M 1/0266; H04M 1/72544
  See application file for complete search history.

(56) References Cited

U.S. PATENT DOCUMENTS

| | | |
|---|---|---|
| 2008/0152298 A1 | 6/2008 | Ubillos |
| 2008/0256452 A1* | 10/2008 | Berndt .................... A63F 13/06 715/728 |
| 2010/0245680 A1 | 9/2010 | Tsukada et al. |
| 2011/0211802 A1* | 9/2011 | Kamada ............... G11B 27/034 386/201 |
| 2013/0176415 A1 | 7/2013 | Kim et al. |
| 2013/0324192 A1* | 12/2013 | Lee ..................... H04M 1/0266 455/557 |
| 2014/0169765 A1* | 6/2014 | Wang ...................... H04N 9/79 386/280 |
| 2015/0019969 A1* | 1/2015 | Lee ..................... G06F 3/04842 715/719 |

OTHER PUBLICATIONS

European Patent Office Application Serial No. 15178306.5, Search Report dated Oct. 27, 2015, 6 pages.

\* cited by examiner

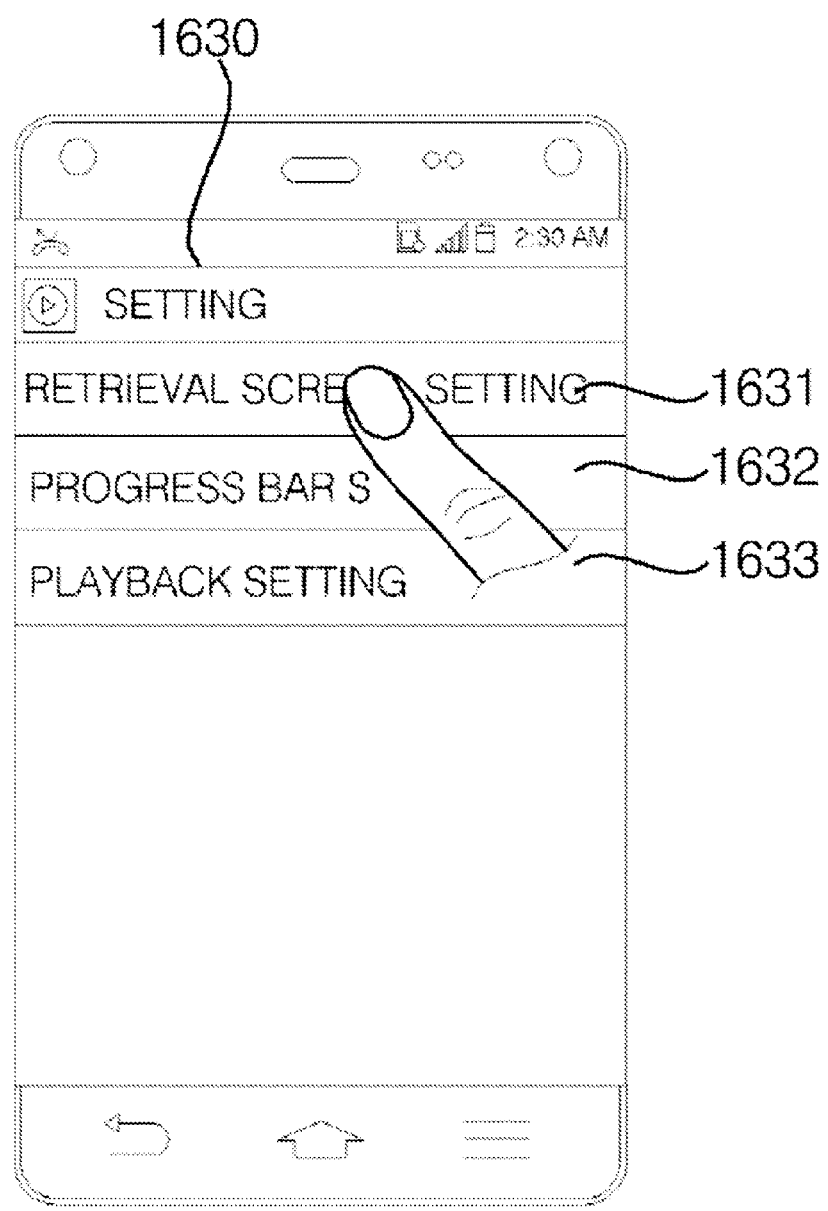

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2014-0096150, filed on Jul. 29, 2014, the entire contents of which are hereby incorporated by reference in its entirety.

BACKGROUND

1. Field of the Disclosure

The present invention relates to a mobile terminal and a control method thereof, and more particularly to a mobile terminal which enables easy retrieval of a multimedia file and a control method thereof.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, conventional mobile terminals have performed retrieval on a per playback time frame basis through use of a progress bar when playing back a multimedia file. When the overall playback time of a multimedia file is long, users who perform retrieval using the progress bar have complained of the inconvenience. This is because precise retrieval is difficult via touch input to the progress bar. Therefore, there is a demand for technology that enables retrieval even when the overall playback time of a multimedia file is long.

As to a mobile communication terminal that functions to rapidly retrieve a playback position and a method for rapidly retrieving a playback position, reference is made to Korean Patent Laid-Open Publication No. 10-2007-0025182.

SUMMARY

A mobile terminal includes a display and controller configured to cause the display to display a playback screen of a first multimedia file and cause the display to display a first retrieval screen in response to receiving a first user input during the displaying of the playback screen of the first multimedia file, such that the first retrieval screen includes a plurality of thumbnail images respectively corresponding to one of a plurality of playback points in time on a per first time interval basis of the first multimedia file. The controller also causes the display to play the first multimedia file beginning at a playback point in time that corresponds to a selected one of the plurality of thumbnail images.

A method for controlling a mobile terminal having a display includes displaying on the display a playback screen of a first multimedia file; displaying a first progress bar upon receiving a first user input at the playback screen of the first multimedia file, the first progress bar corresponding to a predetermined first playback period of a shorter playback time than an overall playback time of the first multimedia file; and playing back the first multimedia file at a playback point in time corresponding to a touch point of a touch input received at a portion of the first progress bar.

As aspect of the present disclosure is to provide a mobile terminal which enables easy retrieval of a multimedia file and a control method thereof. One embodiment provides a mobile terminal including a display unit configured to display a playback screen of a first multimedia file and a controller configured to display, on the display unit, a first retrieval screen upon receiving a first user input via the playback screen of the first multimedia file, the first retrieval screen including a plurality of thumbnail images corresponding to playback points in time on a per first time interval basis of the first multimedia file, wherein, when any one of the thumbnail images is selected, the controller is configured to play back the first multimedia file at a playback point in time corresponding to the selected thumbnail image.

In another aspect, a control method of a mobile terminal includes displaying a playback screen of a first multimedia file, displaying, on a display unit, a first retrieval screen upon receiving a first user input via the playback screen of the first multimedia file, the first retrieval screen including a plurality of thumbnail images corresponding to playback points in time on a per first time interval basis of the first multimedia file, and when any one of the thumbnail images is selected, playing back the first multimedia file at a playback point in time corresponding to the selected thumbnail image.

Further scope of applicability of the embodiments presented herein will become apparent from the detailed description. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure.

FIGS. 16A, 16B, 16C, 16D and 16E depict screens illustrating an operation for setting a retrieval screen according to an embodiment of the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
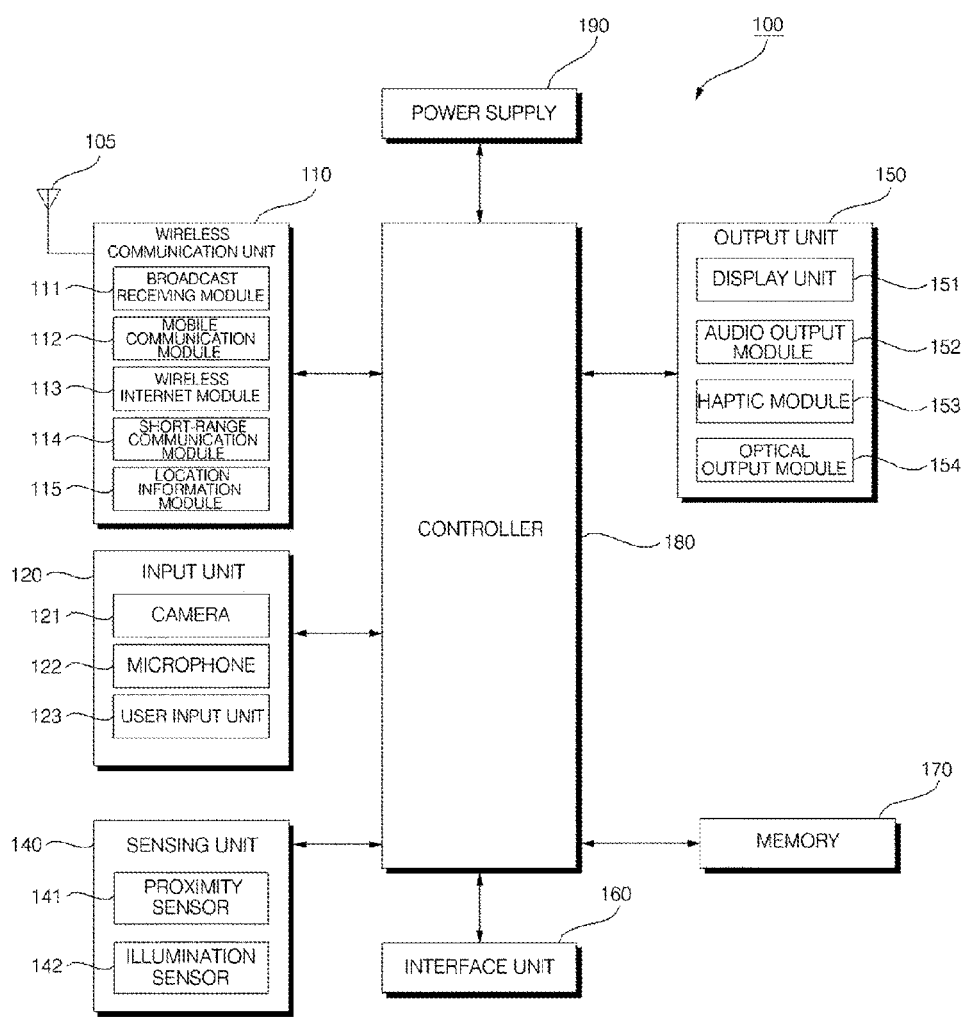
FIG. 1A is a block diagram of a mobile terminal in accordance with the present disclosure.
Figure 1B:
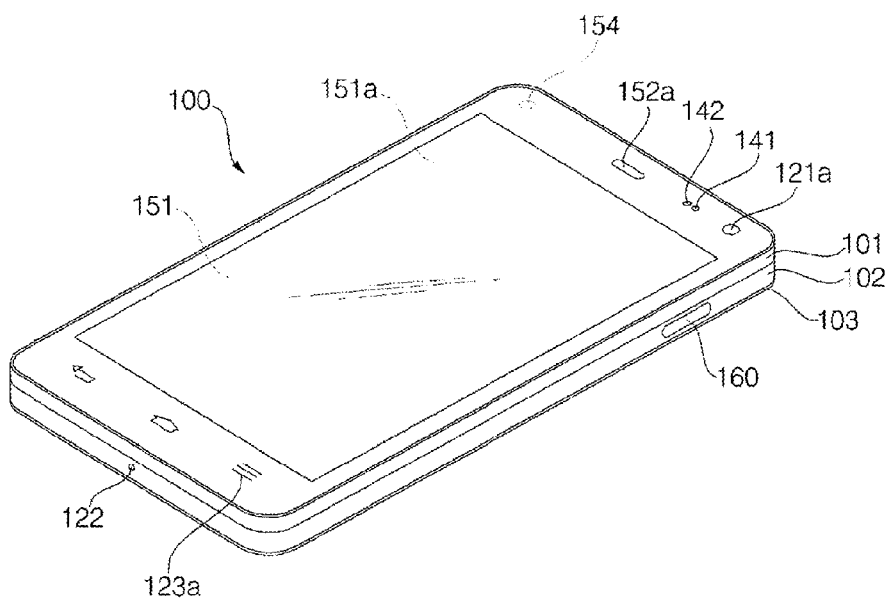
FIGS. 1B and 1C depict one example of a mobile terminal, viewed from different directions.
Figure 1C:
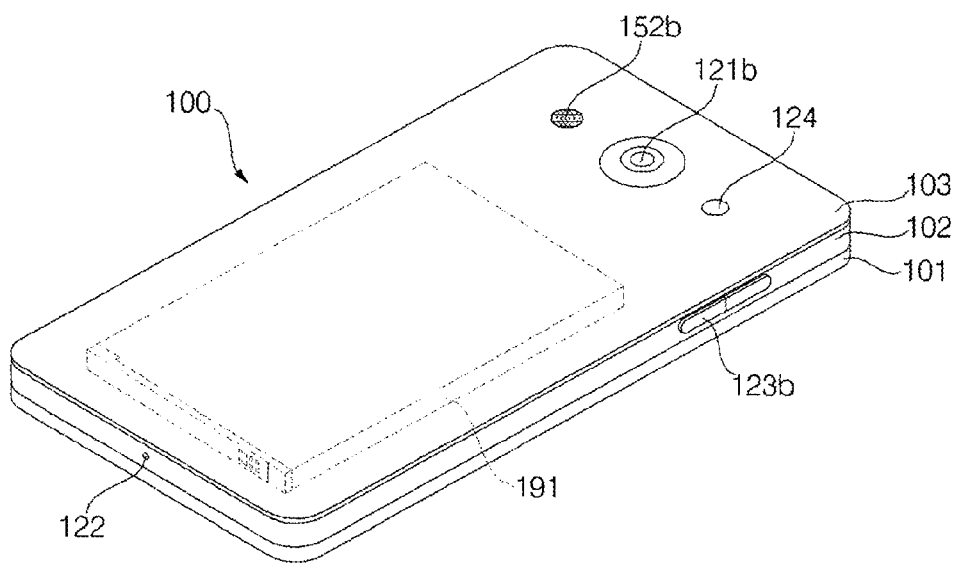

Reference is now made to FIGS. 1A-1C, where FIG. 1A is a block diagram of a mobile terminal in accordance with the present disclosure, and FIGS. 1B and 1C are views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from the sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The controller 180 may be implemented using at least one of application specific integrated circuits (ASICs), digital signal processors (DSPs), digital signal processing devices (DSPDs), programmable logic devices (PLDs), field programmable gate arrays (FPGSs), processors, micro-controllers, microprocessors and electrical units for executing other functions.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Further preferred embodiments will be described in more detail with reference to additional drawing figures. It is understood by those skilled in the art that the present features can be embodied in several forms without departing from the characteristics thereof.

Description has been given above as to the configuration of the mobile terminal according to the present invention with reference to FIGS. 1a-1c. Hereinafter, the mobile terminal and a control method thereof according to embodiments of the present invention will be described in detail.

Figure 2:
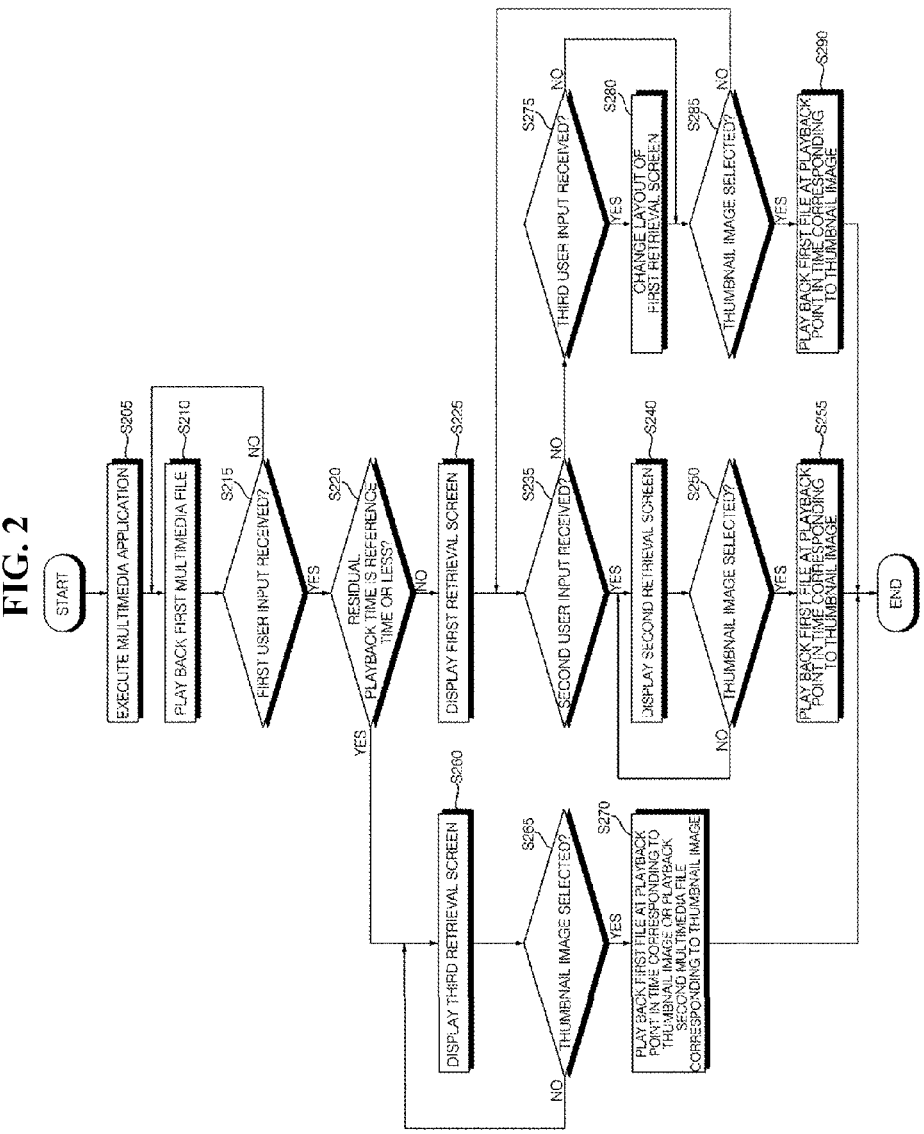
FIG. 2 is a flowchart illustrating an operation of a mobile terminal according to an embodiment of the present invention.

FIG. 2 is a flowchart illustrating an operation of a mobile terminal according to an embodiment of the present invention.

Referring to FIG. 2, the controller 180 executes a multimedia application (S205). Here, the multimedia application may be an application that can play back a multimedia file in the mobile terminal 100. For example, the multimedia application may be a video playback application or a music playback application.

The multimedia application may be executed via a user input. For example, the multimedia application may be executed via a touch input to a multimedia application icon on the home screen.

In a state where the multimedia application has been executed, the controller 180 plays back a first file (S210) such as a multimedia file. For example, the first file may be a video file or a music file.

Meanwhile, the first file may be a file prestored in the memory 170. Alternatively, the first file may be a file provided in a streaming format from a third party server or other location.

The controller 180 may play back the first file by receiving a user input or by a predetermined input. The controller 180 may display a playback screen of the first file on the display unit 151.

Upon receiving a first user input in a state where the first file is being played back (S215), the controller 180 determines whether or not a residual playback time of the first file is a reference time or less (S220).

When the first user input is received (S215) and the residual playback time of the first file is greater than the reference time (S220), the controller 180 displays a first retrieval screen (S225).

The first user input is a predetermined input to display a retrieval screen. For example, the first user input may be a pinch-in input received at the display unit 151 on the first file playback screen.

The first retrieval screen is a screen in which the first file can be retrieved on a per playback time frame basis. The first retrieval screen may include a plurality of thumbnail images corresponding to playback points in time on a per first time interval basis of the first file. Here, the first time interval may be a predetermined time interval.

The thumbnail images are thumbnail images corresponding to playback points in time on a per predetermined first time interval basis before and after a point in time when the first user input is received. That is, the thumbnail images may be thumbnail images corresponding to playback points in time on a per predetermined first time interval basis before a point in time when the first user input is received. In addition, the thumbnail images may include thumbnail images corresponding to playback points in time on a per predetermined first time interval basis after the point in time when the first user input is received.

For example, upon receiving the first user input in a state where the first time interval is set to 1 minute, the controller 180 displays a plurality of thumbnail images corresponding to playback points in time of 1 minute ago, 2 minutes ago, 3 minutes ago and 4 minutes ago on the basis of a point in time when the first user input is received. In addition, the controller 180 displays a plurality of thumbnail images corresponding to playback points in time of 1 minute later, 2 minutes later, 3 minutes later and 4 minutes later on the basis of the point in time when the first user input is received. At this time, the number of the thumbnail images displayed in the first retrieval screen may vary according to a setting. Alternatively, the thumbnail images may be limited to the number of images that can be arranged in the first retrieval screen.

Meanwhile, the thumbnail images may be thumbnail images of playback screens at respective playback points in time on a per first time interval basis of the first file. For example, a thumbnail image corresponding to a playback point in time of 1 minute ago may be a reduced thumbnail image of a playback screen that was played back 1 minute ago. In addition, a thumbnail image corresponding to a playback point in time of 1 minute later may be a reduced thumbnail image of a playback screen that will be played back 1 minute later.

The first retrieval screen may include a first reduced playback screen of the first file. For example, upon receiving the first user input, the controller 180 reduces a screen that is being played back and arranges the reduced playback screen in a region of the first retrieval screen. In addition, the controller 180 arranges the thumbnail images as described above around the first reduced playback screen. At this time, the thumbnail images may be limited to the number of images that can be arranged in a region except for the first reduced playback screen.

Meanwhile, the controller 180 controls the first file to be continuously played back even when the first user input is received. That is, the controller 180 controls a playback screen of the first file so as to be continuously displayed via the first reduced playback screen without stoppage of a playback operation.

Meanwhile, while the first file is being played back in the first reduced playback screen, the controller 180 also controls the thumbnail images to be played back for a time corresponding to the playback time of the first file. For example, when the first file is played back for 1 second in the first reduced playback screen, the controller 180 may display a video image that is played back for 1 second from a playback point in time of 1 minute ago in a region where a thumbnail image corresponding to the playback point in time of 1 minute ago is displayed.

Here, the reference time may be a time corresponding to the predetermined first time interval. For example, when the first time interval is set to 1 minute, the reference time may be 1 minute.

When a second user input is received at the first retrieval screen (S235), the controller 180 displays a second retrieval screen (S240). The second user input may include predetermined input to switch from the displayed first retrieval screen to a second retrieval screen. For example, the second user input may be a pinch-in input received from the display unit 151 in the first retrieval screen.

The second retrieval screen is a screen in which the first file can be retrieved on a per playback time frame basis, but is different from the above-described first retrieval screen because the second retrieval screen includes a plurality of thumbnail images corresponding to playback points in time on a per second time interval basis of the first file. At this time, the second time interval may be shorter than the first time interval. For example, when the first time interval is 1 minute, the second time interval may be 30 seconds. The first time interval and the second time interval may be set to defaults, or may be determined by a user setting.

The thumbnail images included in the second retrieval screen are thumbnail images corresponding to playback points in time on a per predetermined second time interval basis before and after a point in time when the second user input is received. That is, the thumbnail images may include thumbnail images corresponding to playback points in time on a per predetermined second time interval basis before a point in time when the second user input is received. In addition, the thumbnail images may include thumbnail images corresponding to playback points in time on a per predetermined second time interval basis after the point in time when the second user input is received.

For example, upon receiving the second user input in a state where the second time interval is set to 30 seconds, the controller 180 displays a plurality of thumbnail images corresponding to playback points in time of 30 seconds ago, 60 seconds ago, 90 seconds ago, 120 seconds ago, 150 seconds ago, 180 seconds ago and 210 seconds ago on the basis of a point in time when the second user input is received. In addition, the controller 180 displays a plurality of thumbnail images corresponding to playback points in time of 30 seconds later, 60 seconds later, 90 seconds later, 120 seconds later, 150 seconds later, 180 seconds later and 210 seconds later on the basis of the point in time when the second user input is received. At this time, the number of the thumbnail images displayed in the second retrieval screen may vary according to setting. Alternatively, the thumbnail images may be limited to the number of images that can be arranged in the second retrieval screen.

Meanwhile, the thumbnail images included in the second retrieval screen may be smaller than the thumbnail images included in the first retrieval screen. In this case, the second retrieval screen may include a greater number of thumbnail images than the first retrieval screen.

Meanwhile, the thumbnail images may be thumbnail images of playback screens at respective playback points in time on a per second time interval basis of the first file. For example, a thumbnail image corresponding to a playback point in time of 30 seconds ago may be a reduced thumbnail image of a playback screen that was played back 30 seconds ago. In addition, a thumbnail image corresponding to a playback point in time of 30 seconds later may be a reduced thumbnail image of a playback screen that will be played back 30 seconds later.

The second retrieval screen may include a second reduced playback screen of the first file. The second reduced playback screen included in the second retrieval screen may be smaller than the first reduced playback screen included in the first retrieval screen. For example, upon receiving the second user input, the controller 180 reduces the first reduced playback screen, which is being played back in the first retrieval screen, once more and arranges the resulting second reduced playback screen in a region of the second retrieval screen. In addition, the controller 180 arranges the thumbnail images as described above around the second reduced playback screen. At this time, the thumbnail images may be limited to the number of images that can be arranged in a region except for the second reduced playback screen.

Meanwhile, the controller 180 controls the first file to be continuously played back even when the second user input is received. That is, the controller 180 controls a playback screen of the first file so as to be continuously displayed via the second reduced playback screen without stoppage of a playback operation.

Meanwhile, while the second file is being played back in the second reduced playback screen, the controller 180 also controls the thumbnail images so as to be played back for a time corresponding to the playback time of the first file. For example, when the first file is played back for 1 second in the second reduced playback screen, the controller 180 may display a video image that is played back for 1 second from a playback point in time of 30 seconds ago in a region where a thumbnail image corresponding to the playback point in time of 30 seconds ago is displayed.

When any one thumbnail image among the thumbnail images is selected in a state where the second retrieval screen is displayed (S250), the controller 180 plays back the first file at a playback point in time corresponding to the selected thumbnail image (S255). In this case, the controller 180 may display a playback screen of the first file on the entire region of the display unit 151.

When a residual playback time in block S220 is the reference time or less, the controller 180 displays a third retrieval screen (S260). The third retrieval screen is a screen in which the first file can be retrieved on a per playback time frame basis or files to be played back via the multimedia application can be retrieved. The third retrieval screen may also include a plurality of thumbnail images corresponding to playback points in time on a per first time interval basis of the first file. In addition, the third retrieval screen may include thumbnail images corresponding to files to be played back via the multimedia application.

For example, upon receiving the first user input in a state where the first time interval is set to 1 minute and a playback time of the first file remains 30 seconds, the controller 180 determines whether or not the residual playback time of the first file is 1 minute or less. When the residual playback time of the first file is 1 minute or less, the controller 180 displays the third retrieval screen. The controller 180 displays a plurality of thumbnail images corresponding to playback points in time of 1 minute ago, 2 minutes ago, 3 minutes ago and 4 minutes ago on the basis of a point in time when the first user input is received. Since a playback time of the first file remains at most 30 seconds, in this example, the controller 180 cannot display the thumbnail images corresponding to playback points in time of 1 minute later, 2 minutes later, 3 minutes later and 4 minutes later. In this case, the controller 180 displays thumbnail images corresponding to playable files in the third retrieval screen.

At this time, the controller 180 may display the thumbnail images corresponding to the respective playable files according to priority in a folder in which the first file is stored. Alternatively, in the case where the first file is part of a series, the controller 180 may display thumbnail images corresponding to the other files of the series based on names of the files. At this time, the number of the thumbnail images displayed on the third retrieval screen may vary according to setting. Alternatively, the thumbnail images may be limited to the number of thumbnail images that can be arranged in the third retrieval screen.

The third retrieval screen may include the first reduced playback screen of the first file. The first reduced playback screen has been described above.

When any one thumbnail image among the thumbnail images in the third retrieval screen is selected (S265), the controller 180 plays back the first file at a playback point in time corresponding to the selected thumbnail image, or plays back a second multimedia file corresponding to the selected thumbnail image (S270). In this case, the controller 180 may display a playback screen of the first file or the second multimedia file on the entire region of the display unit 151.

Here, the selected thumbnail image may be any one of thumbnail images corresponding to playback points in time on a per first time interval basis of the first file. Alternatively, the selected thumbnail image may be any one of thumbnail images corresponding to the files that can be played back via the multimedia application.

In block S235, when the second user input is not received and a third user input is received in the first retrieval screen (S275), the controller 180 varies a layout of the first retrieval screen (S280).

The third user input may be a predetermined input to change a layout of the first reduced playback screen and the thumbnail images arranged in the first retrieval screen. For example, the third user input may be a touch and drag input to the first reduced playback screen.

For example, when the first reduced playback screen is located at the center of the first retrieval screen, an upward touch and drag input to the first reduced playback screen may be received. In this case, the controller 180 arranges the first reduced playback screen at an upper end of the first retrieval screen in response to the drag input. Then, the controller 180 arranges the thumbnail images in a region of the first retrieval screen remaining after the first reduced playback screen is arranged. At this time, the controller 180 may arrange the thumbnail images according to the playback time sequence.

When any one thumbnail image among the thumbnail images is selected after the layout of the first retrieval screen is completely changed (S285), the controller 180 plays back the first file at a playback point in time corresponding to the selected thumbnail image (S290). In this case, the controller 180 may display a playback screen of the first file on the entire region of the display unit 151.

On the other hand, when the second and third user inputs are not received in a state where the first retrieval screen is displayed (S235 and S275) and any one thumbnail image among the thumbnail images is selected (S285), the controller 180 plays back the first file at a playback point in time corresponding to the selected thumbnail image (S290).

Figure 3:
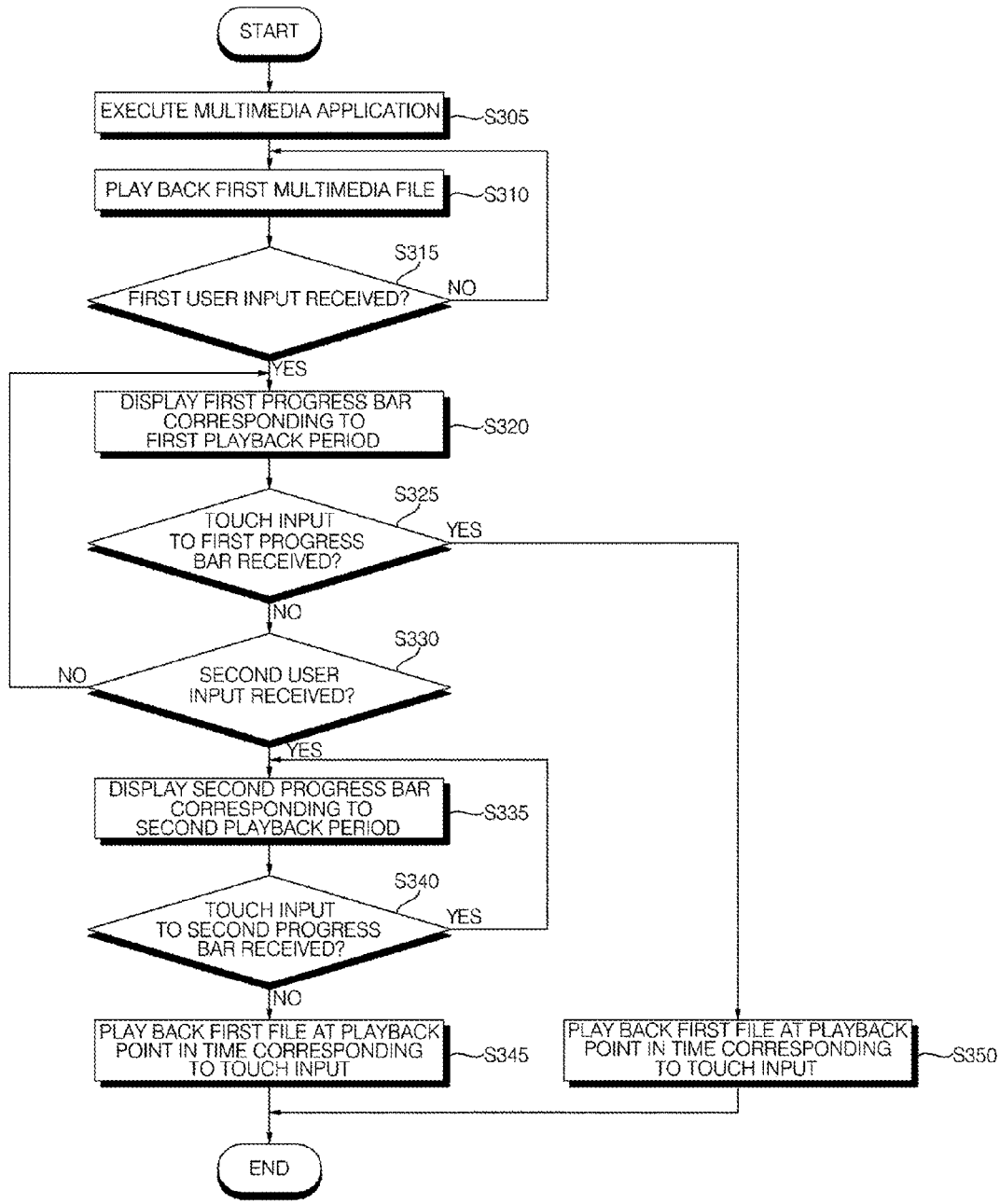
FIG. 3 is a flowchart illustrating an operation of the mobile terminal according to another embodiment of the present invention.

FIG. 3 is a flowchart illustrating an operation of the mobile terminal according to another embodiment of the present invention.

Referring to FIG. 3, the controller 180 executes a multimedia application (S305). Here, the multimedia application may be an application that can play back a multimedia file at the mobile terminal 100. For example, the multimedia application may be a video playback application or a music playback application.

The multimedia application may be executed via a user input. For example, the multimedia application may be executed via a touch input to a multimedia application icon at a home screen.

In a state where the multimedia application has been executed, the controller 180 plays back a first file (S310). Here, the first file is a multimedia file. For example, the first file may be a video file or a music file.

Meanwhile, the first file may be a file prestored in the memory 170. Alternatively, the first file may be a file provided in a streaming format from a third party server.

The controller 180 may play back the first file by receiving a user input or by a predetermined input. The controller 180 may display a playback screen of the first file on the display unit 151.

Upon receiving a first user input in a state where the first file is being played back (S315), the controller 180 displays a first progress bar corresponding to a first playback period (S320).

The first user input is a predetermined input to display the first progress bar. For example, the first user input may be a pinch-out input received from the display unit 151 in the first file playback screen.

The first playback period is a playback period corresponding to a shorter playback time than the overall playback time of the first file. For example, when the overall playback time of the first file is 120 minutes, the first playback period may be 10 minutes.

In general, the progress bar indicates the progress state of a multimedia file that is being played. Upon receiving a touch input to the progress bar, the controller 180 may move to a prescribed playback point in time to perform a playback operation, or may perform, for example, a fast forward operation or a rewind operation.

The first progress bar is a progress bar to perform a function for retrieving a first file on a per playback time frame basis within a prescribed period (a first playback period) before and after a point in time when the first user input is received. For example, upon receiving the first user input during playback of the first file having the overall playback time of 120 minutes, the controller 180 displays the first progress bar that is capable of performing a retrieval function for a period of 10 minutes from 5 minutes before the point in time when the first user input is received to 5 minutes after the point in time when the first user input is received. At this time, the first progress bar may be located at a lower end of the first file playback screen to extend in a left-and-right direction.

Upon receiving a touch input to the first progress bar in a state where the first progress bar is displayed (S325), the controller 180 plays back the first file at a playback point in time corresponding to the touch input (S350).

For example, in a state where the first progress bar is displayed, the user may touch a 4 minutes later point of the first progress bar. In this case, the controller 180 plays back the first file at a playback point in time of 4 minutes later corresponding to the user touch point.

Using the first progress bar as described above has the effect of allowing the user to easily move to a desired playback point in time while a multimedia file having a long playback time is being played back. That is, when attempting to move a playback point in time using the progress bar, a multimedia file having a long playback time may have difficulty in moving to and being played back at a desired playback point in time because a length of the progress bar is shorter than the playback time of the multimedia file. Using the relatively short first progress bar for implementation of a retrieval function for a relatively short period may have the effect of allowing the user to perform precise retrieval.

Upon receiving no touch input to the first progress bar (S325) and receiving a second user input (S330), the controller 180 displays a second progress bar corresponding to a second playback period (S335).

The second user input is a predetermined input to display the second progress bar. For example, the second user input may be a pinch-output input received from the display unit 151 in a state where the first progress bar is displayed.

The second playback period is a playback period corresponding to a shorter playback time than the playback time of the first playback period. For example, when the playback time of the first playback period is 10 minutes, the playback time of the second playback period may be 2 minutes.

The second progress bar is a progress bar to perform a function for retrieving the first file on a per playback time frame basis within a prescribed period (the second playback period) before and after a point in time when the second user input is received. For example, upon receiving the second user input in a state where the first progress bar is displayed, the controller 180 displays the second progress bar that is capable of performing a retrieval function for a period of 2 minutes from 1 minute before the point in time when the second user input is received to 1 minute after the point in time when the second user input is received. At this time, the second progress bar may be located at a lower end of the first file playback screen to extend in a left-and-right direction.

Upon receiving a touch input to the second progress bar in a state where the second progress bar is displayed (S340), the controller 180 plays back the first file at a playback point in time corresponding to the touch input (S345).

For example, in a state where the second progress bar is displayed, the user may touch a 30 seconds later point of the second progress bar. In this case, the controller 180 plays back the first file at a playback point in time of 30 seconds later corresponding to the user touch point.

Figure 4A:
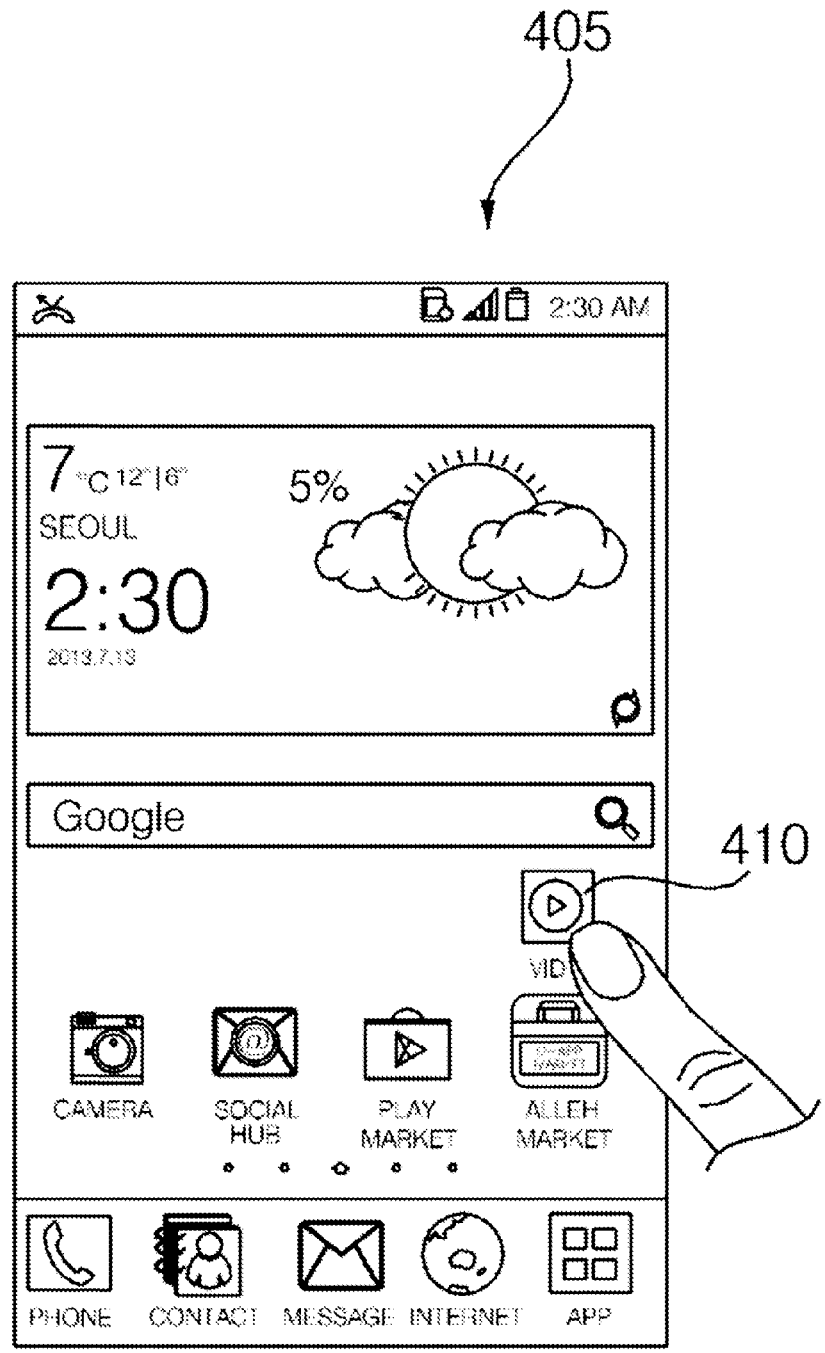
FIGS. 4A, 4B and 4C depict screens illustrating operation for playing back a multimedia file according to an embodiment of the present invention.
Figure 4B:
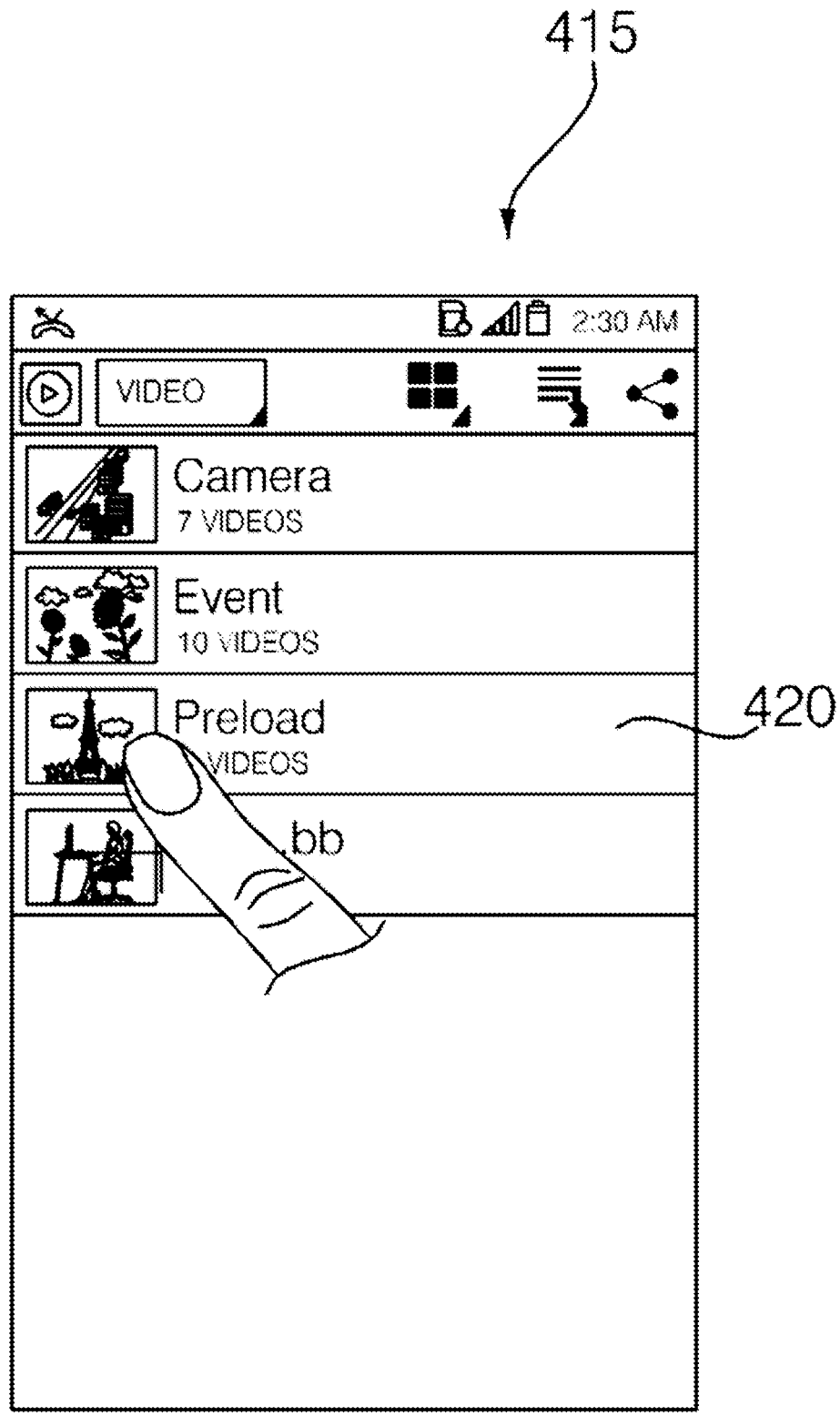
Figure 4C:
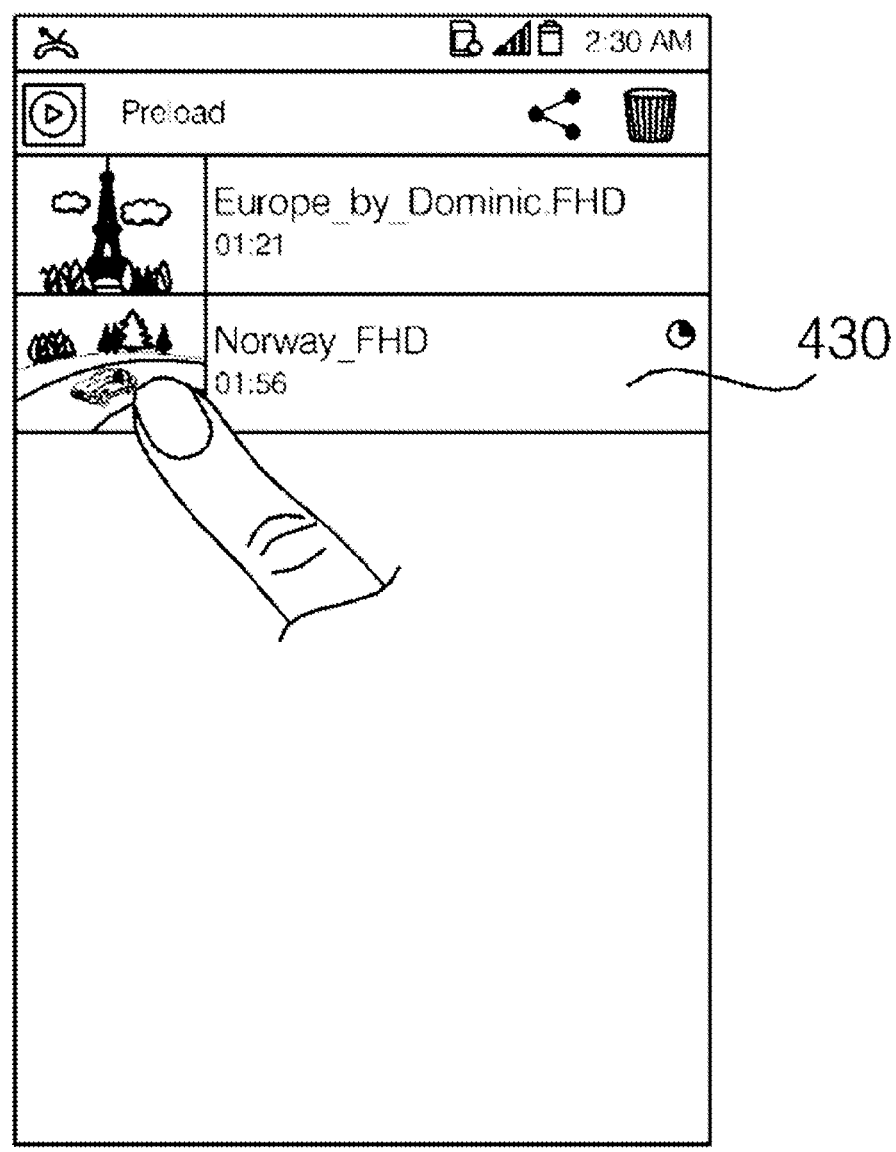

FIGS. 4a, 4b and 4c depict screens illustrating operation for playing back a multimedia file according to an embodiment of the present invention.

As exemplarily illustrated in FIG. 4A, in a state where a home screen 405 is displayed, the controller 180 receives a touch input to a video playback application icon 410. Upon receiving the touch input to the video playback application icon 410, as exemplarily illustrated in FIG. 4B, the controller 180 displays a video playback application screen 415. In a state where the video playback application screen 415 is displayed, the controller 180 selects a first folder 420 by receiving a user input.

When the first folder 420 is selected, as exemplarily illustrated in FIG. 4C, the controller 180 displays at least one multimedia file included in the first folder 420. When a first file 430 is selected by a user input, the controller 180 plays back the first file.

Meanwhile, FIGS. 4A to 4C illustrate an operation for playing back a selected multimedia file among files stored in the memory 170, the present disclosure is not limited thereto. That is, a multimedia file that is played back by a user input may be provided in a streaming format from a third party server.

Meanwhile, FIGS. 4A to 4C illustrate the first file as a video file without being limited thereto.

Figure 5A:
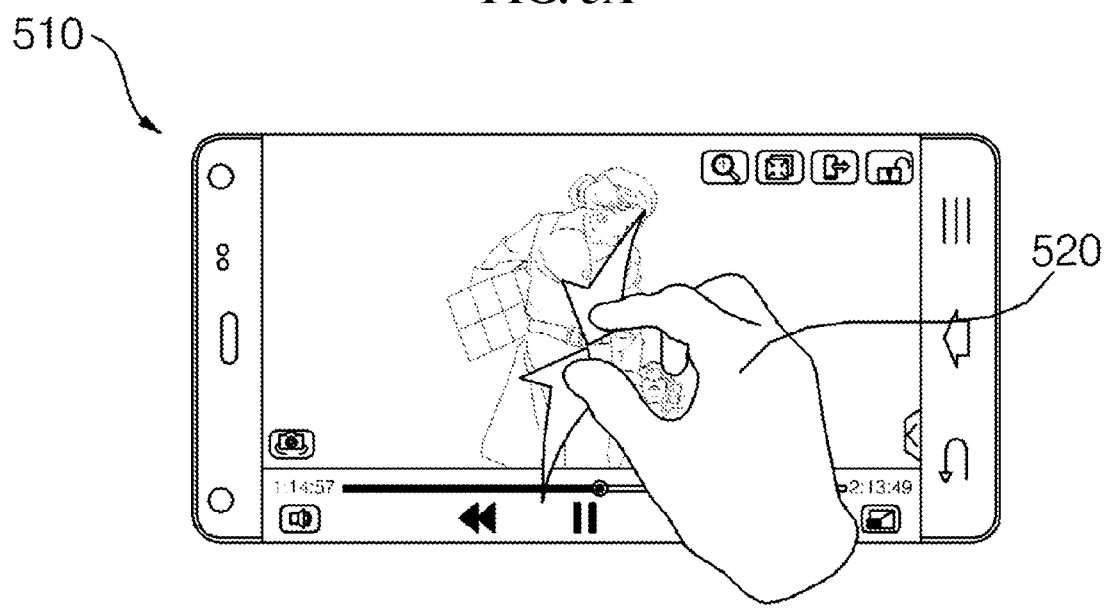
FIGS. 5A, 5B and 5C depict screens illustrating operation for displaying a first retrieval screen according to an embodiment of the present invention.
Figure 5B:
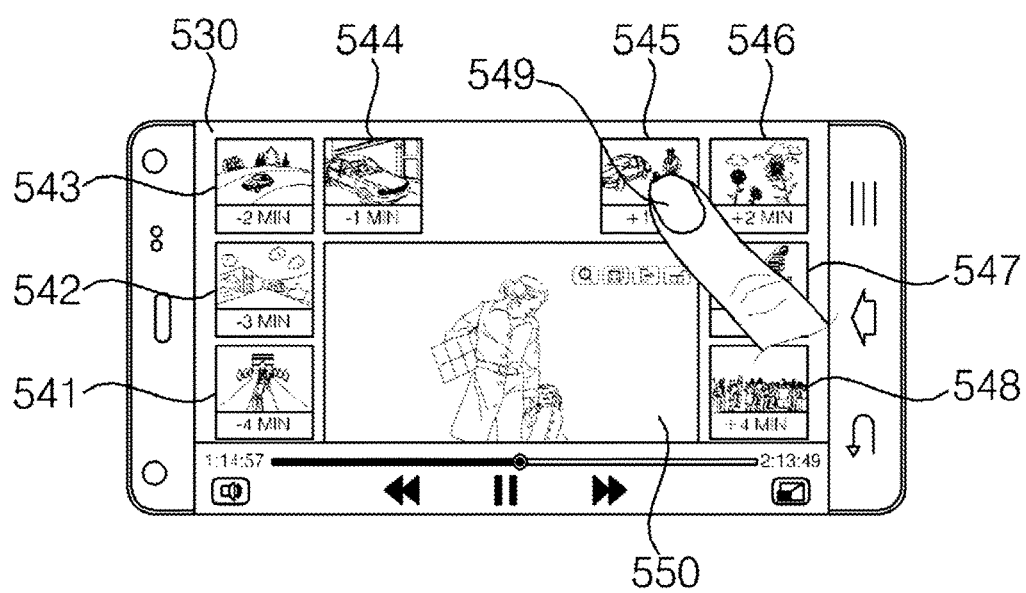
Figure 5C:
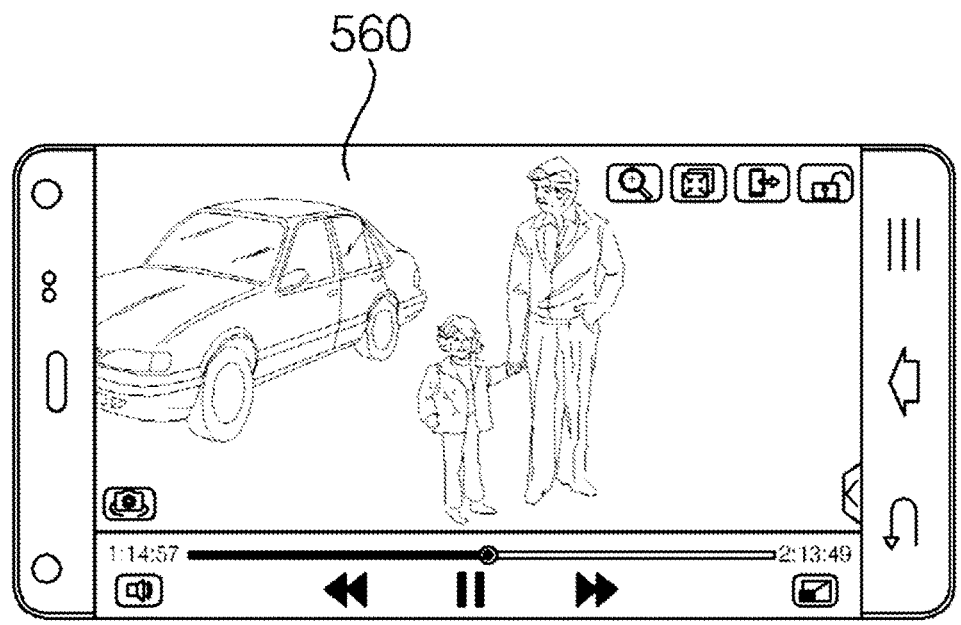

FIGS. 5A, 5B and 5C depict screens illustrating operation for displaying a first retrieval screen according to an embodiment of the present invention.

As exemplarily illustrated in FIG. 5A, the controller 180 plays back a selected first file. The controller 180 displays a playback screen 510 of the first file on the display unit 151. In a state where the first file is played back, the controller 180 receives a pinch-in input 520.

Upon receiving the pinch-in input, the controller 180 determines whether or not a residual playback time of the first file is a reference time or less. The residual playback time of the first file is greater than the reference time, as exemplarily illustrated in FIG. 5B, the controller 180 displays a first retrieval screen 530.

The first retrieval screen 530 is a screen in which the first file can be retrieved on a per playback time frame basis. The first retrieval screen includes a plurality of thumbnail images 541 to 548 corresponding to playback points in time on a per first time interval basis of the first file. Here, the first time interval is a predetermined time interval. In FIG. 5A-5C, the predetermined first time interval is 1 minute. The controller 180 displays, in the first retrieval screen 530, a thumbnail image 541 corresponding to a playback point in time of 4 minutes ago, a thumbnail image 542 corresponding to a playback point in time of 3 minutes ago, a thumbnail image 543 corresponding to a playback point in time of 2 minutes ago and a thumbnail image 544 corresponding to a playback point in time of 1 minute ago on the basis of a point in time when the pinch-in input is received.

In addition, the controller 180 displays, in the first retrieval screen 530, a thumbnail image 545 corresponding to a playback point in time of 1 minute later, a thumbnail image 546 corresponding to a playback point in time of 2 minutes later, a thumbnail image 547 corresponding to a playback point in time of 3 minutes later and a thumbnail image 548 corresponding to a playback point in time of 4 minute later on the basis of the point in time when the pinch-in input is received. At this time, the number of the thumbnail images displayed in the first retrieval screen 530 may vary according to a setting. Alternatively, the thumbnail images displayed in the first retrieval screen 530 may be limited to the number of images that can be arranged in the first retrieval screen 530.

Meanwhile, the thumbnail images 541 to 548 displayed in the first retrieval screen 530 may be thumbnail images of playback screens at respective playback points in time on a per first time interval basis of the first file.

The controller 180 may display a first reduced playback screen 550 of the first file in a region of the first retrieval screen 530. In a state where the first reduced playback screen 550 is displayed, the controller 180 arranges the thumbnail images 541 to 548 as described above around the first reduced playback screen 550. At this time, the thumbnail images 541 to 548 may be limited to the number of images that can be arranged in a remaining region of the first retrieval screen 530 except for the first reduced playback screen 550.

Meanwhile, the controller 180 controls the first file to be continuously played back even when the pinch-in input is received during playback of the first file. That is, when the pinch-in input is received during playback of the first file at the entire region of the display unit 151, the controller 180 controls a playback screen of the first file so as to be continuously displayed via the first reduced playback screen 550 included in the first retrieval screen 530.

Meanwhile, while the first file is being played back in the first reduced playback screen 550, the controller 180 also controls the thumbnail images 541 to 548 displayed in the first retrieval screen 530 to be played back for a time corresponding to the playback time of the first file. For example, when the first file is played back for 1 second in the first reduced playback screen 550, the controller 180 may display a video image that is played back for 1 second in each region where each of the thumbnail images 541 to 548 is displayed.

When a touch input 549 to the 1 minute later thumbnail image 545 among the thumbnail images in the first retrieval screen 530 is received, as exemplarily illustrated in FIG. 5C, the controller 180 plays back the first file at a playback point in time corresponding to the selected thumbnail image 545.

At this time, the touch input 549 may be a short touch input to the selected thumbnail image 545. Alternatively, the touch input 549 may be a touch and drag input to the selected thumbnail image 545. That is, the touch input 549 may be a motion for touching the selected thumbnail image 545, dragging the touched thumbnail image 545 to the first reduced playback screen 550, and releasing the touch input.

Figure 6A:
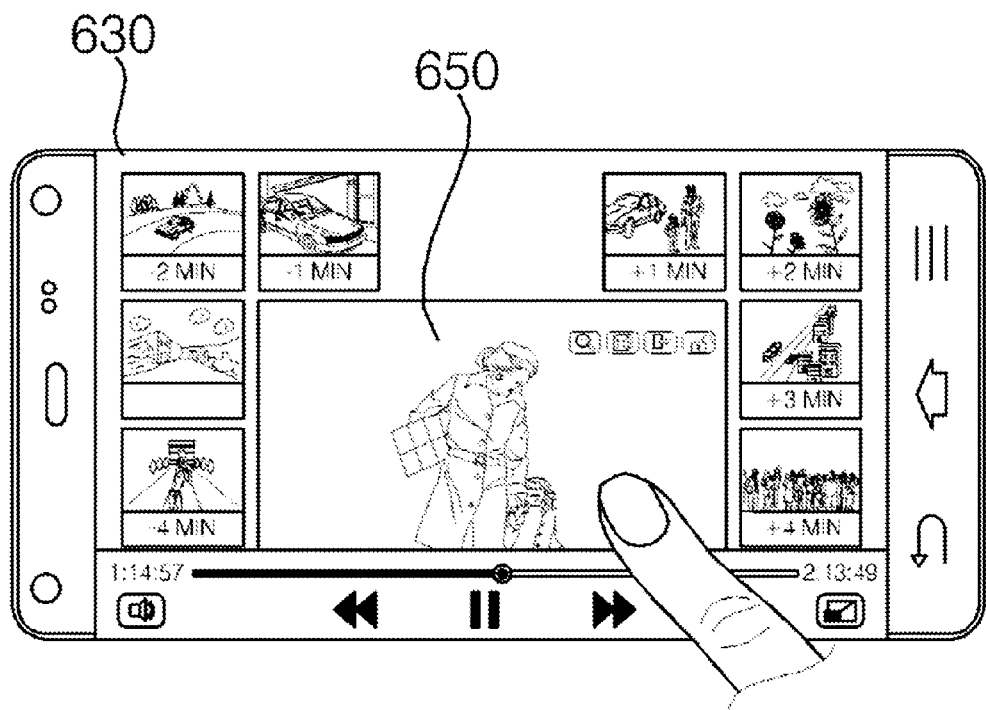
FIGS. 6A and 6B depict screens illustrating a return operation from a first retrieval screen to a playback screen according to an embodiment of the present invention.
Figure 6B:

FIGS. 6A and 6b depict screens illustrating a return operation from a first retrieval screen to a playback screen according to an embodiment of the present invention.

As exemplarily illustrated in FIG. 6A, in a state where a first retrieval screen 630 is displayed, the controller 180 receives a short touch input to a first reduced playback screen 650. In this case, as exemplarily illustrated in FIG. 6B, the controller 180 displays a playback screen of a first file on the entire region of the display unit 151.

Figure 7A:
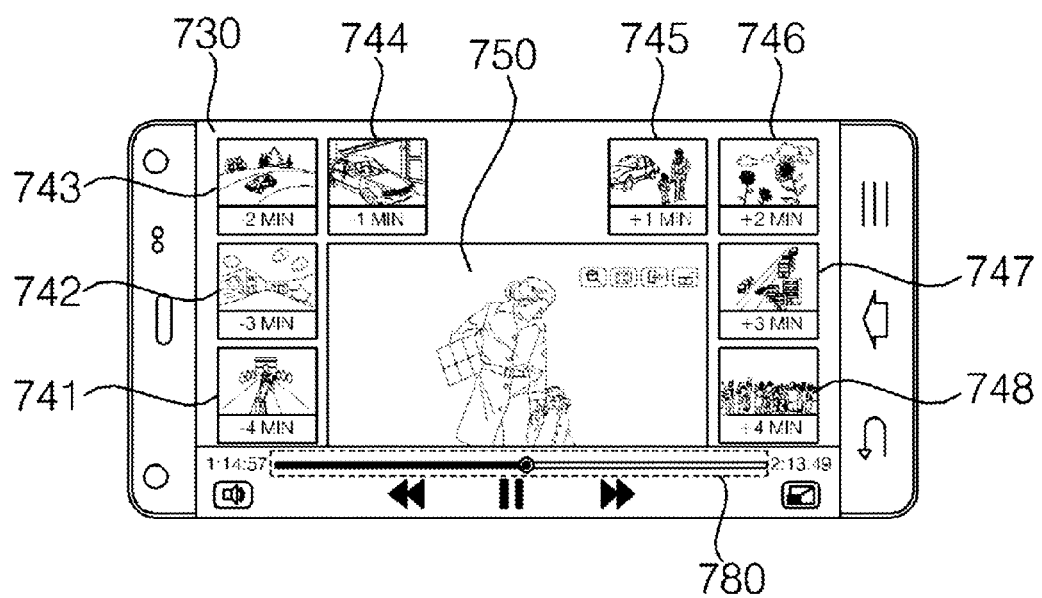
FIGS. 7A, 7B and 7C depict screens illustrating an operation for displaying a playback time corresponding to a thumbnail image on a progress bar according to an embodiment of the present invention.
Figure 7B:
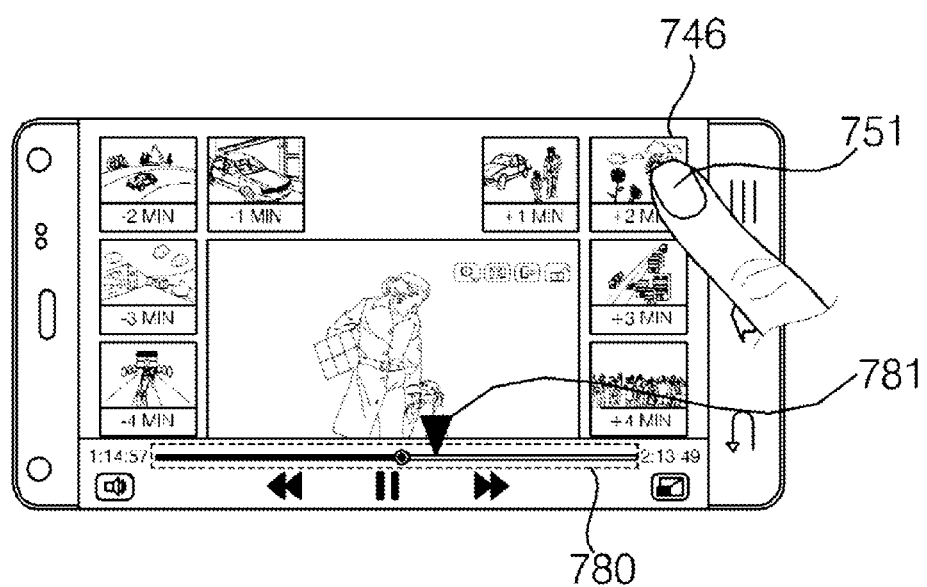
Figure 7C:
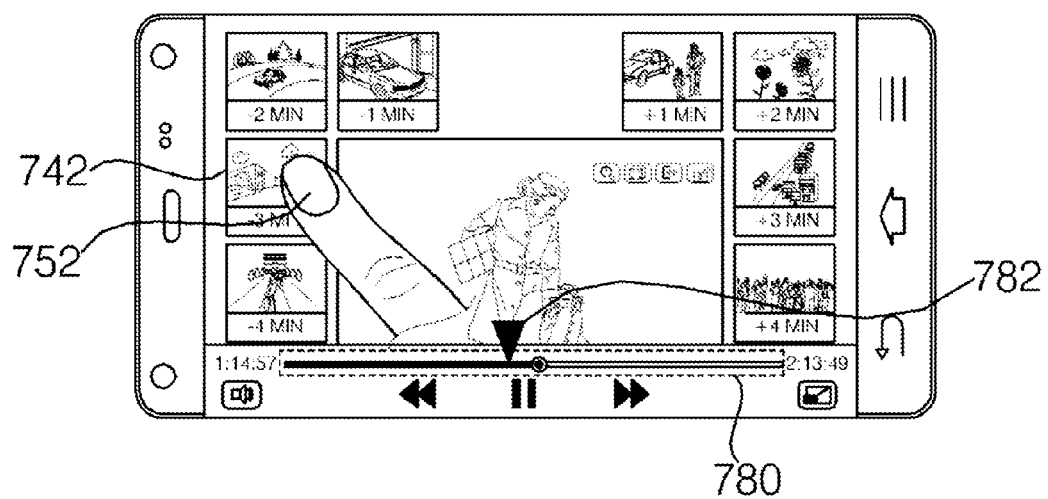

FIGS. 7A, 7B and 7C depict screens illustrating an operation for displaying a playback time corresponding to a thumbnail image on a progress bar according to an embodiment of the present invention.

As exemplarily illustrated in FIG. 7A, the controller 180 displays a first retrieval screen 730. The controller 180 displays a plurality of thumbnail images 741 to 748 and a first reduced playback screen 750 in the first retrieval screen 730. In addition, a progress bar 780 is displayed in the first retrieval screen 730. Here, the progress bar indicates the progress state of a first file that is being played back.

In a state where the first retrieval screen 730 is displayed, as exemplarily illustrated in FIG. 7b, the controller 180 receives a touch input 751 at a second-a thumbnail image 746 among the thumbnail images 741 to 748. The touch input 751 may be a long touch input or a short touch input. In this case, the controller 180 displays, on the progress bar 780, an indicator 781 that indicates a playback time corresponding to the second-a thumbnail image 746. Through the indicator 781, the user can check a playback point in time corresponding to the second-a thumbnail image 746 for the overall playback period of the first file.

Likewise, in a state where the first retrieval screen 730 is displayed, as exemplarily illustrated in FIG. 7C, upon receiving a touch input 752 to a second-b thumbnail image 742, the controller 180 displays, on the progress bar 780, an indicator 782 to indicate a playback time corresponding to the second-b thumbnail image 742.

Figure 8A:
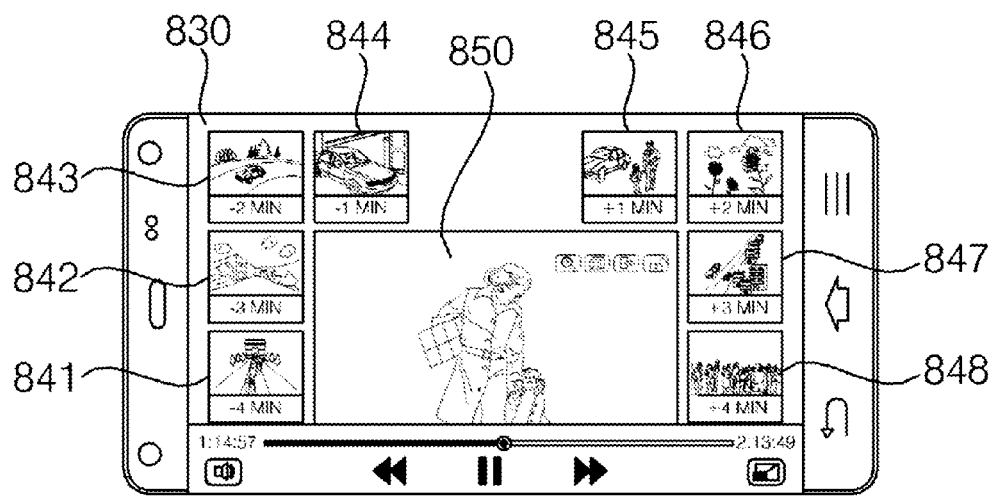
FIGS. 8A, 8B and 8C depict screens illustrating an operation for displaying a preview image of a playback point in time corresponding to a thumbnail image according to an embodiment of the present invention.
Figure 8B:
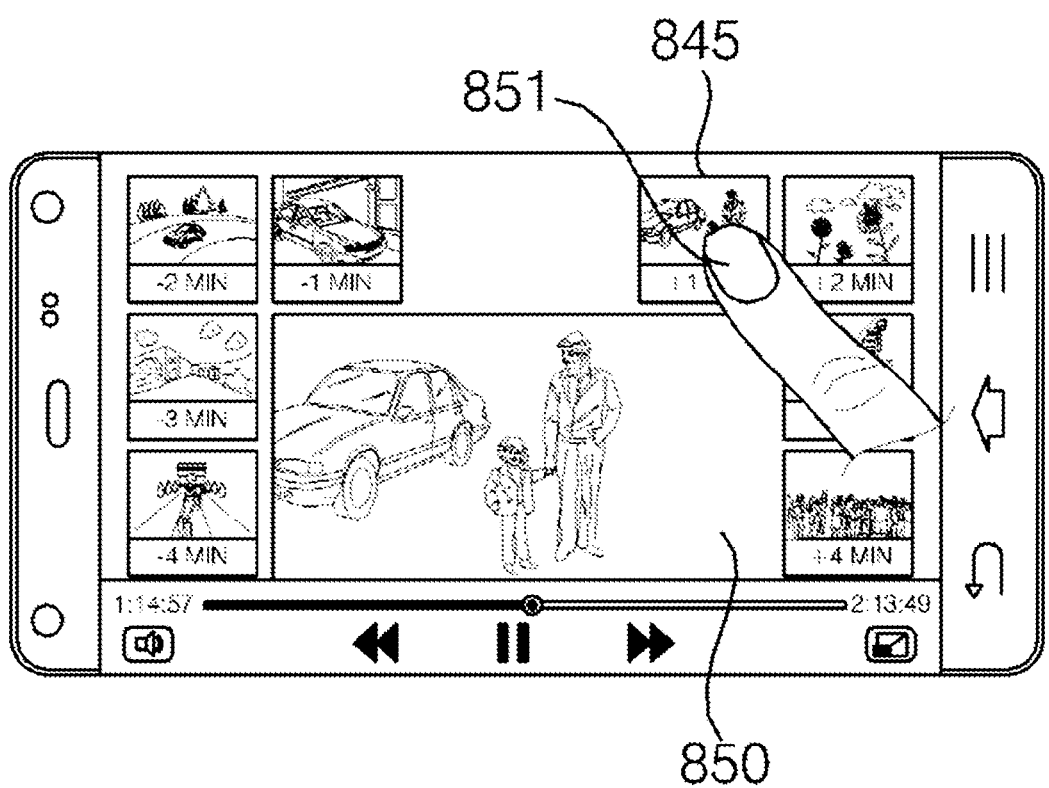
Figure 8C:
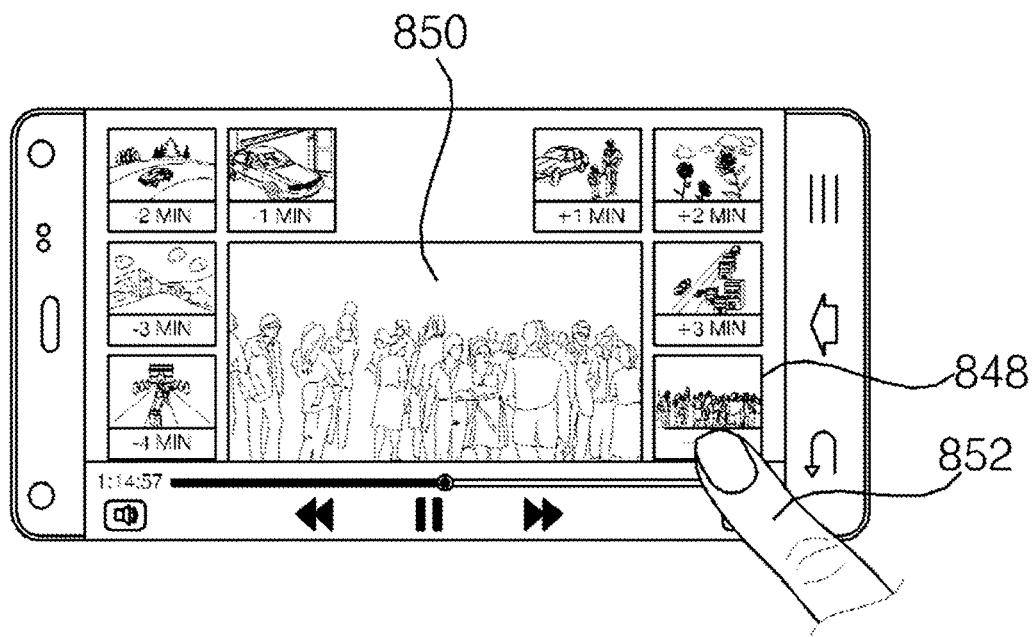

FIGS. 8A, 8B and 8C depict screens illustrating an operation for displaying a preview image of a playback point in time corresponding to a thumbnail image according to an embodiment of the present invention.

As exemplarily illustrated in FIG. 8A, the controller 180 displays a first retrieval screen 830. The controller 180 displays a plurality of thumbnail images 841 to 848 and a first reduced playback screen 850 in the first retrieval screen 830.

In a state where the first retrieval screen 830 is displayed, as exemplarily illustrated in FIG. 8B, the controller 180 receives a touch input 851 to a second-a thumbnail image 845 among the thumbnail images 841 to 848. At this time, the touch input 851 may be a long touch input or a short touch input. In this case, the controller 180 displays, in the first reduced playback screen 850, a preview image of a playback point in time corresponding to the second-a thumbnail image 845. At this time, the preview image may be a video. Since the thumbnail image displays a playback screen at a prescribed playback point in time in a small screen, the user may not precisely check the screen displayed by the thumbnail image. The preview image may allow the user to check whether or not a playback point in time corresponding to the thumbnail image is a desired playback point in time.

Likewise, in a state where the first retrieval screen 830 is displayed, as exemplarily illustrated in FIG. 8c, upon receiving a touch input 852 to a second-b thumbnail image 848, the controller 180 displays, in the first reduced playback screen 850, a preview image of a playback point in time corresponding to the second-b thumbnail image 848.

Figure 9A:
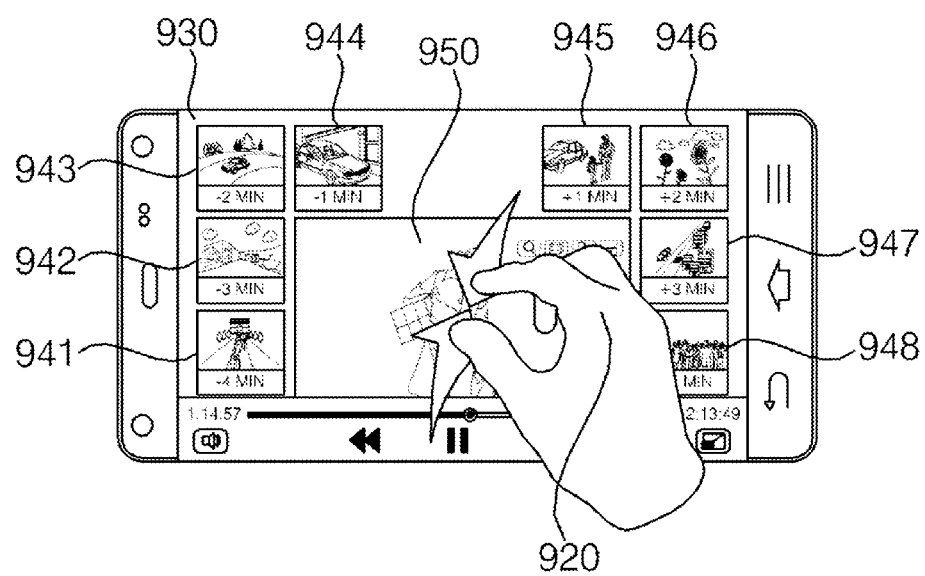
FIGS. 9A, 9B and 9C depict screens illustrating an operation for displaying a second retrieval screen according to an embodiment of the present invention.
Figure 9B:
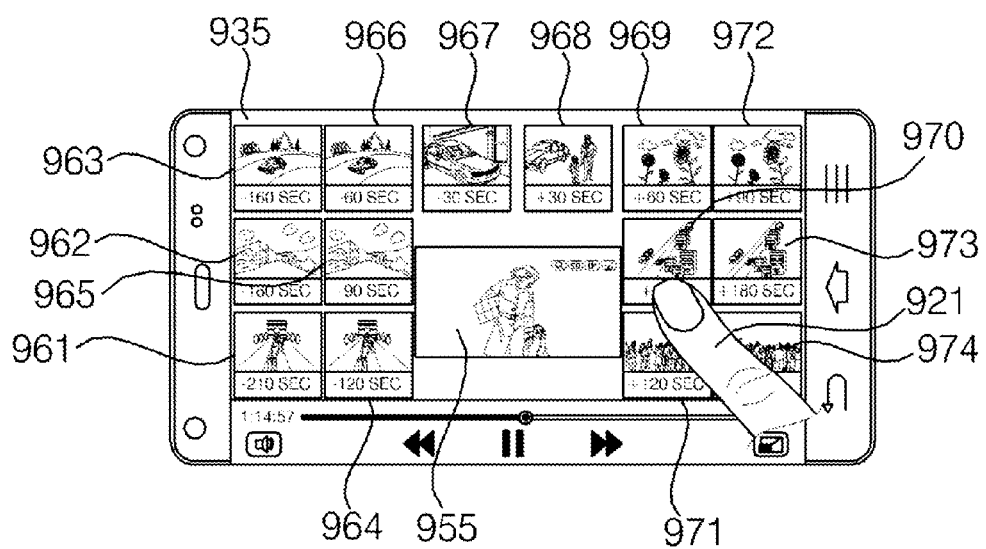
Figure 9C:
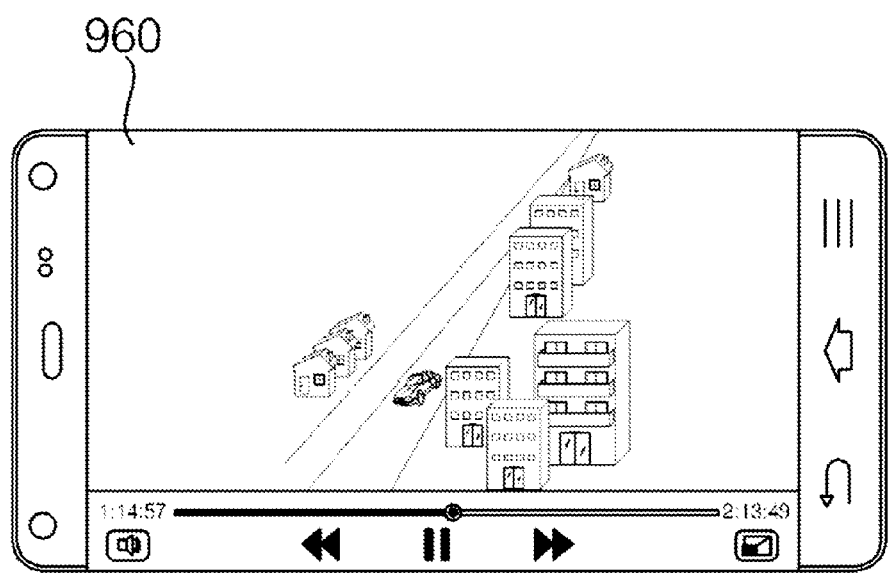

FIGS. 9A, 9B and 9C depict screens illustrating an operation for displaying a second retrieval screen according to an embodiment of the present invention.

As exemplarily illustrated in FIG. 9A, the controller 180 displays a first retrieval screen 930. The controller 180 displays a plurality of thumbnail images 941 to 948 and a first reduced playback screen 950 in the first retrieval screen 930. In a state where the first retrieval screen 930 is displayed, the controller 180 receives a pinch-in input 920.

Upon receiving the pinch-in input, as exemplarily illustrated in FIG. 9B, the controller 180 displays a second retrieval screen 935.

The second retrieval screen 935 is a screen in which a first file can be retrieved on a per playback time frame basis. The second retrieval screen 935 includes a plurality of thumbnail images 961 to 974 corresponding to playback points in time on a per second time interval basis of the first file. Here, the second time interval is shorter than the first time interval as described above. The second time interval is a predetermined time interval. In FIG. 9B, the predetermined second time interval is 30 seconds. The controller 180 displays, in the second retrieval screen 935, a thumbnail image 961 corresponding to a playback point in time of 210 seconds ago, a thumbnail image 962 corresponding to a playback point in time of 180 seconds ago, a thumbnail image 963 corresponding to a playback point in time of 150 seconds ago, a thumbnail image 964 corresponding to a playback point in time of 120 seconds ago, a thumbnail image 965 corresponding to a playback point in time of 90 seconds ago, a thumbnail image 966 corresponding to a playback point in time of 60 seconds ago, and a thumbnail image 967 corresponding to a playback point in time of 30 seconds ago, on the basis of a point in time when the pinch-in input is received.

In addition, the controller 180 displays, in the second retrieval screen 935, a thumbnail image 968 corresponding to a playback point in time of 30 seconds later, a thumbnail image 969 corresponding to a playback point in time of 60 seconds later, a thumbnail image 970 corresponding to a playback point in time of 90 seconds later, a thumbnail image 971 corresponding to a playback point in time of 120 seconds later, a thumbnail image 972 corresponding to a playback point in time of 150 seconds later, a thumbnail image 973 corresponding to a playback point in time of 180 seconds later, and a thumbnail image 974 corresponding to a playback point in time of 210 seconds later, on the basis of the point in time when the pinch-in input is received. At this time, the number of the thumbnail images displayed in the second retrieval screen 935 may vary according to setting. Alternatively, the thumbnail images displayed in the second retrieval screen 935 may be limited to the number of images that can be arranged in the second retrieval screen 935.

Meanwhile, the thumbnail images 961 to 974 included in the second retrieval screen 935 may be smaller than the thumbnail images 941 to 948 included in the first retrieval screen 930. In this case, the second retrieval screen 935 may include a greater number of thumbnail images than the first retrieval screen 930.

Meanwhile, the thumbnail images 961 to 974 displayed in the second retrieval screen 935 may be thumbnail images of playback screens at respective playback points in time on a per second time interval basis of the first file.

The controller 180 may display a second reduced playback screen 955 of the first file in a region of the second retrieval screen 935. Here, the second reduced playback screen 955 included in the second retrieval screen 935 may be smaller than the first reduced playback screen 950 included in the first retrieval screen 930. For example, upon receiving a pinch-in input in the first retrieval screen 930, the controller 180 reduces the first reduced playback screen 950, which is being played back in the first retrieval screen 930, once more and arranges the resulting second reduced playback screen 955 in a region of the second retrieval screen 935. In addition, the controller 180 arranges the thumbnail images 961 to 974 as described above around the second reduced playback screen 955. At this time, the thumbnail images 961 to 974 may be limited to the number of images that can be arranged in a region except for the second reduced playback screen.

Meanwhile, the controller 180 controls the first file so as to be continuously played back even when a pinch-in input is received in the first retrieval screen 930 during playback of the first file. That is, upon receiving a pinch-in input in the first reduced playback screen 950 during playback of the first file, the controller 180 controls a playback screen of the first file so as to be continuously displayed via the second reduced playback screen 955 included in the second retrieval screen 935.

Meanwhile, while the first file is being played back in the second reduced playback screen 955, the controller 180 controls the thumbnail images 961 to 974 displayed in the second retrieval screen 935 so as to be displayed for a time corresponding to a playback time of the first file. For example, when the first file is played back for 1 second in the second reduced playback screen 955, the controller 180 displays a video image that is played back for 1 second in each region where each of the thumbnail images 961 to 974 is displayed.

When a touch input 921 to the 90 seconds later thumbnail image 970 among the thumbnail images in the second retrieval screen 935 is received, as exemplarily illustrated in FIG. 9c, the controller 180 plays back the first file at a playback point in time corresponding to the selected thumbnail image 970.

At this time, the touch input 921 may be a short touch input to the selected thumbnail image 970. Alternatively, the touch input 921 may be a touch and drag input to the selected thumbnail image 970. That is, the touch input 921 may be a motion for touching the selected thumbnail image 970, dragging the touched thumbnail image 970 to the second reduced playback screen 955, and releasing the touch input.

FIGS. 10A, 10B, 10C, 10D, 10E and 10F depict screens illustrating an operation for changing a screen layout of thumbnail images in a retrieval screen according to an embodiment of the present invention.

Figure 10A:
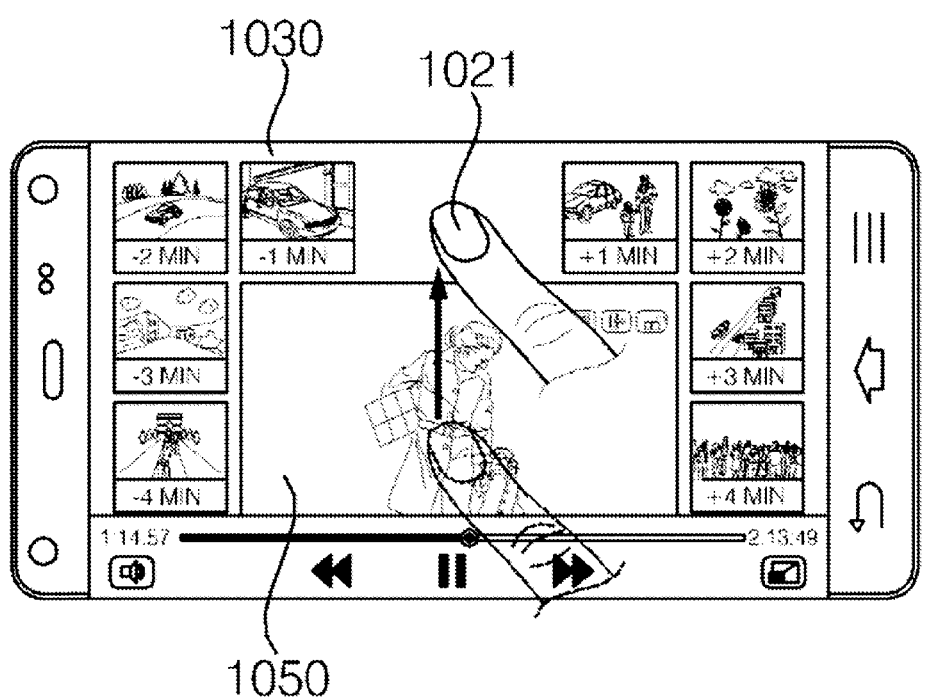
FIGS. 10A, 10B, 10C, 10D, 10E and 10F depict screens illustrating an operation for changing a screen layout of thumbnail images in a retrieval screen according to an embodiment of the present invention.

As exemplarily illustrated in FIG. 10A, the controller 180 displays a first retrieval screen 1030. The controller 180 displays a plurality of thumbnail images and a first reduced playback screen 1050 in the first retrieval screen 1030.

In a state where the first retrieval screen 1030 is displayed, the controller 180 receives a touch and drag input 1021 to the first reduced playback screen 1050. At this time, the touch and drag input moves upward in the first retrieval screen 1030.

Figure 10B:
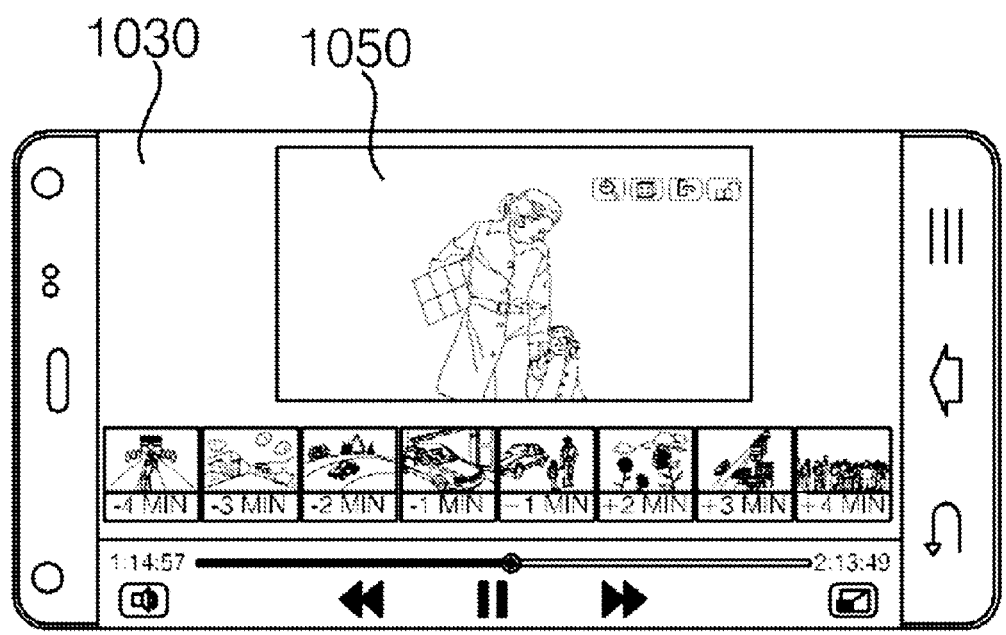

Upon receiving the touch and drag input 1021, as exemplarily illustrated in FIG. 10B, the controller 180 displays the first reduced playback screen 1050 at an upper end of the first retrieval screen 1030. The controller 180 displays the thumbnail images in a region below the first reduced playback screen 1050. At this time, the thumbnail images may be limited to the number of images that can be arranged in a remaining region of the first retrieval screen 1030 except for the first reduced playback screen 1050. At this time, the controller 180 arranges the thumbnail images according to the playback time sequence.

Figure 10C:
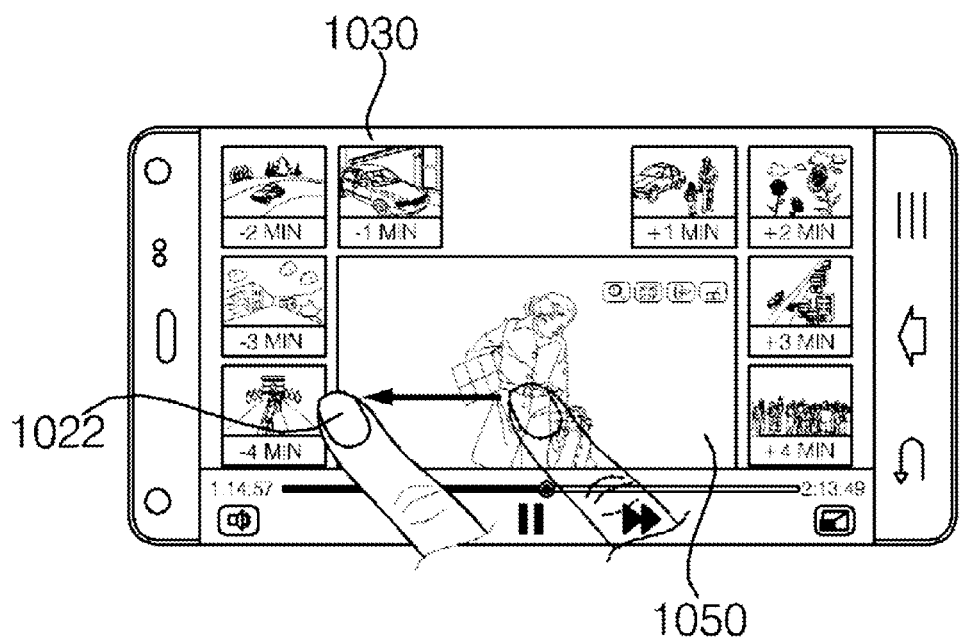

Meanwhile, as exemplarily illustrated in FIG. 10C, in a state where the first retrieval screen 1030 is displayed, the controller 180 receives a touch and drag input 1022 to the first reduced playback screen 1050. At this time, the touch and drag input is moved leftward in a lower region of the first retrieval screen 1030.

Figure 10D:
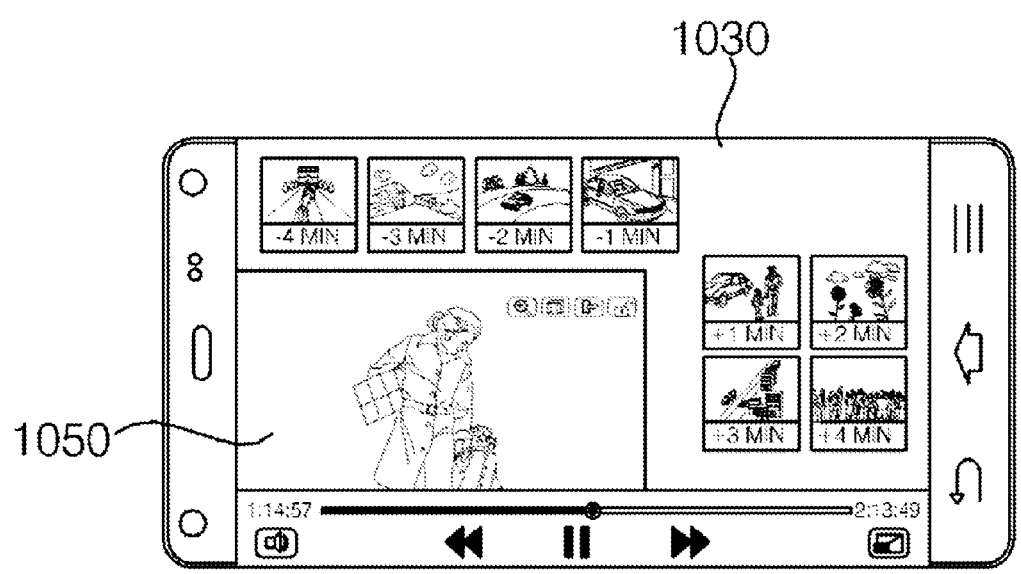

Upon receiving the touch and drag input 1022, as exemplarily illustrated in FIG. 10D, the controller 180 displays the first reduced playback screen 1050 at a left lower end of the first retrieval screen 1030. The controller 180 displays the thumbnail images in regions above and at the right side of the first reduced playback screen 1050. At this time, the thumbnail images may be limited to the number of images that can be arranged in a remaining region of the first retrieval screen 1030 except for the first reduced playback screen 1050. At this time, the controller 180 arranges the thumbnail images according to the playback time sequence.

Figure 10E:
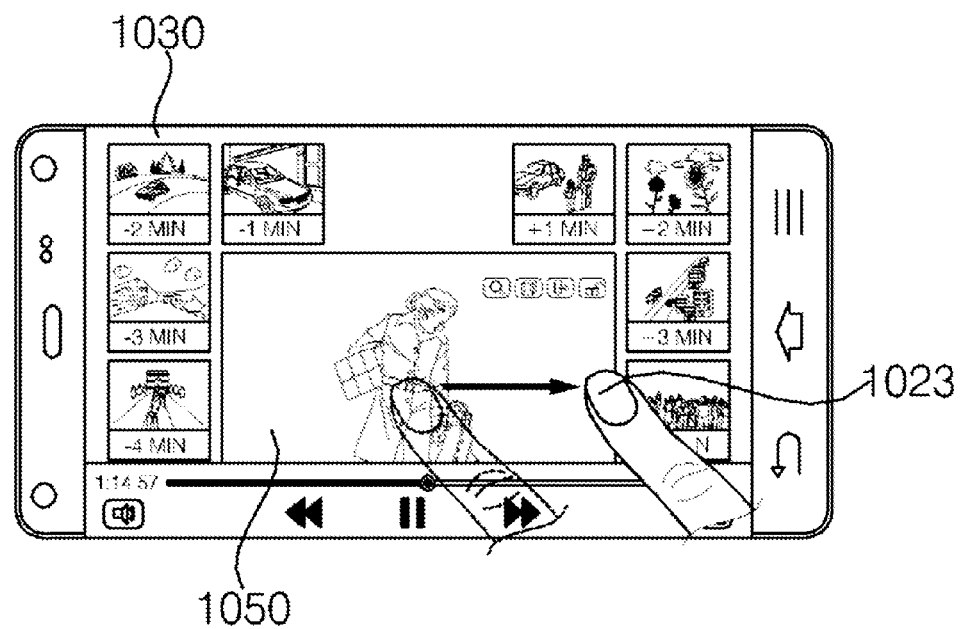

Meanwhile, as exemplarily illustrated in FIG. 10E, in a state where the first retrieval screen 1030 is displayed, the controller 180 receives a touch and drag input 1023 to the first reduced playback screen 1050. At this time, the touch and drag input is moved rightward in a lower region of the first retrieval screen 1030.

Figure 10F:
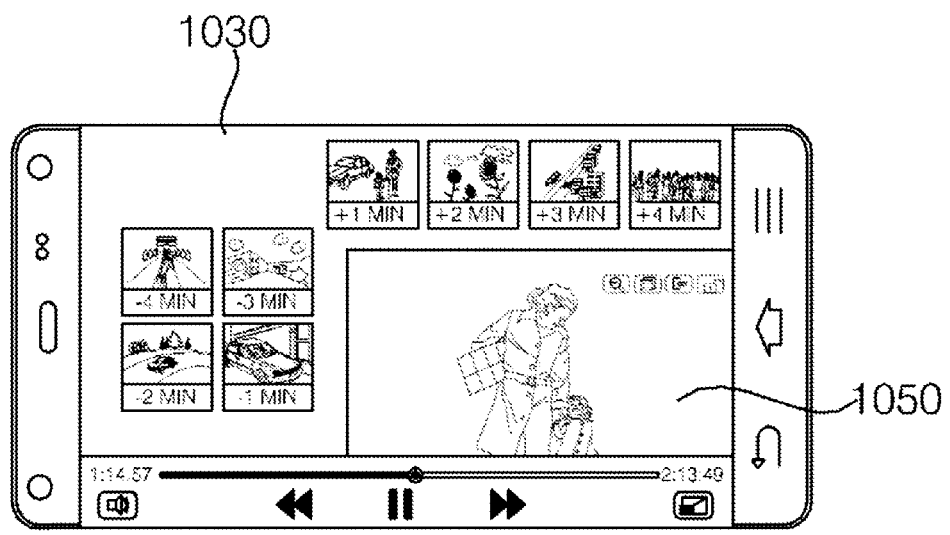

Upon receiving the touch and drag input 1023, as exemplarily illustrated in FIG. 10F, the controller 180 displays the first reduced playback screen 1050 at a right lower end of the first retrieval screen 1030. The controller 180 displays the thumbnail images in regions above and at the left side of the first reduced playback screen 1050. At this time, the thumbnail images may be limited to the number of images that can be arranged in a remaining region of the first retrieval screen 1030 except for the first reduced playback screen 1050. At this time, the controller 180 arranges the thumbnail images according to the playback time sequence.

Figure 11A:
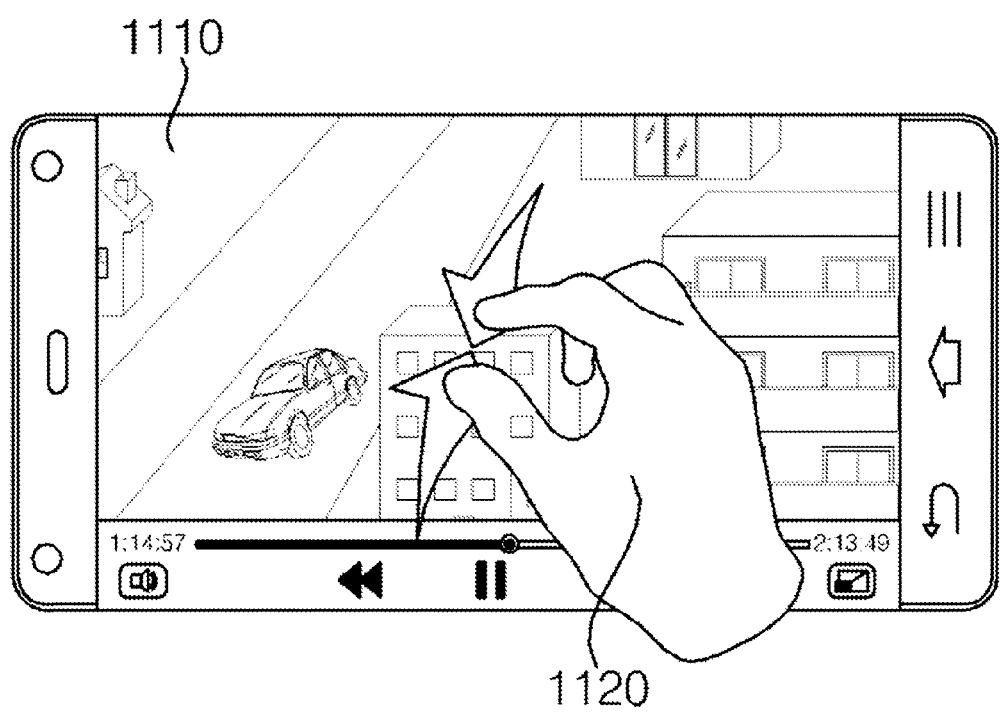
FIGS. 11A and 11B depict screens illustrating an operation for displaying a third retrieval screen according to an embodiment of the present invention.
Figure 11B:
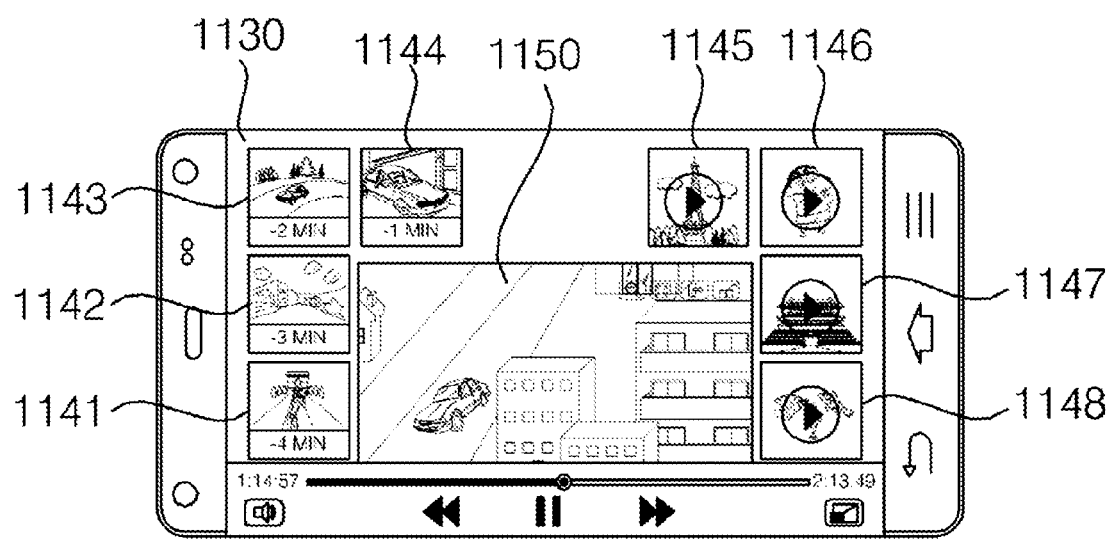

FIGS. 11A and 11B depict screens illustrating an operation for displaying a third retrieval screen according to an embodiment of the present invention.

As exemplarily illustrated in FIG. 11A, the controller 180 plays back a selected first file. The controller 180 displays a playback screen 1110 of the first file on the display unit 151. In a state where the first file is being played back, the controller 180 receives a pinch-in input 1120.

Upon receiving the pinch-in input, the controller 180 determines whether or not a residual playback time of the first file is a reference time or less. Here, the reference time may be a predetermined first time interval.

For example, upon receiving the pinch-in input in a state where the first time interval is set to 1 minute and a playback time of the first file remains 30 seconds, the controller 180 determines whether or not the residual playback time of the first file is 1 minute or less. When the residual playback time of the first file is 1 minute or less, as exemplarily illustrated in FIG. 11B, the controller 180 displays a third retrieval screen 1130. Here, the third retrieval screen 1130 is a screen in which the first file can be retrieved on a per playback time frame basis or files to be played back via the multimedia application can be retrieved.

The controller 180 displays, in the third retrieval screen 1130, a thumbnail image 1141 corresponding to a playback point in time of 4 minutes ago, a thumbnail image 1142 corresponding to a playback point in time of 3 minutes ago, a thumbnail image 1143 corresponding to a playback point in time of 2 minutes ago and a thumbnail image 1144 corresponding to a playback point in time of 1 minute ago on the basis of a point in time when the pinch-in input is received. In addition, since a playback time of the first file remains at most 30 seconds, the controller 180 cannot display, in the third retrieval screen 1130, thumbnail images corresponding to playback points in time of 1 minute later, 2 minutes later, 3 minutes later and 4 minutes later on the basis of the point in time when the pinch-in input is received. In this case, the controller 180 displays thumbnail images 1145 to 1148 corresponding to playable files in the third retrieval screen. At this time, the controller 180 may display the thumbnail images corresponding to the respective playable files according to priority in a folder in which the first file is stored. Alternatively, in the case where the first file is part of a series, the controller 180 may display thumbnail images corresponding to the other files of the series based on names of the files. At this time, the number of the thumbnail images 1141 to 1148 displayed on the third retrieval screen 1130 may vary according to setting. Alternatively, the thumbnail images may be limited to the number of thumbnail images that can be arranged in the third retrieval screen 1130.

The controller 180 may display a first reduced playback screen 1150 of the first file in a region of the third retrieval screen 1130. The first reduced playback screen 1150 has been described above with reference to FIG. 5.

Figure 12A:
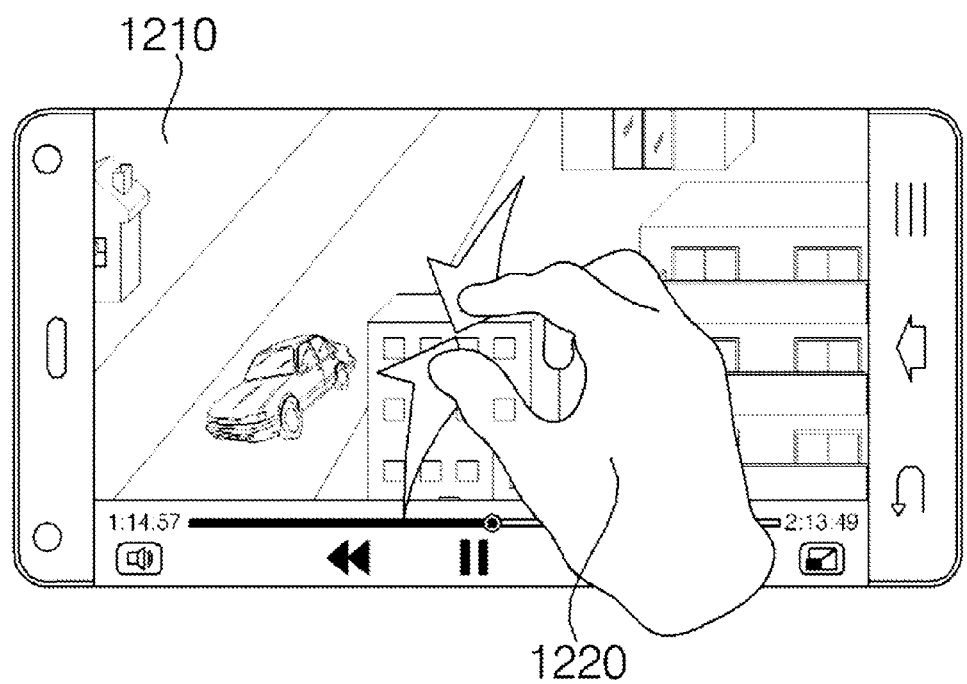
FIGS. 12A, 12B and 12C depict screens illustrating an operation for displaying thumbnail images of playable multimedia files in a state where playback of a first file has ended according to an embodiment of the present invention.
Figure 12B:
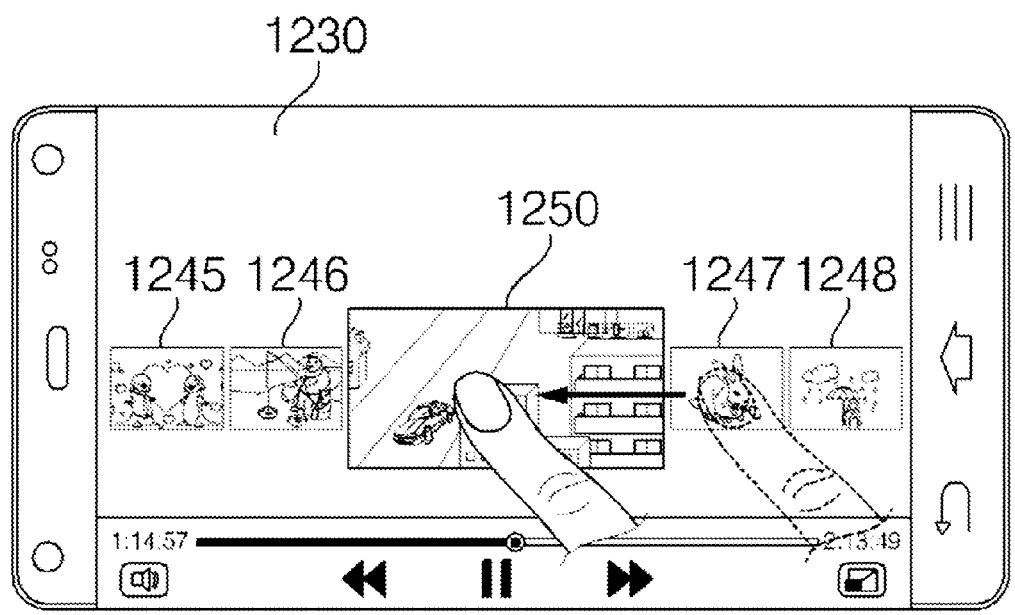
Figure 12C:
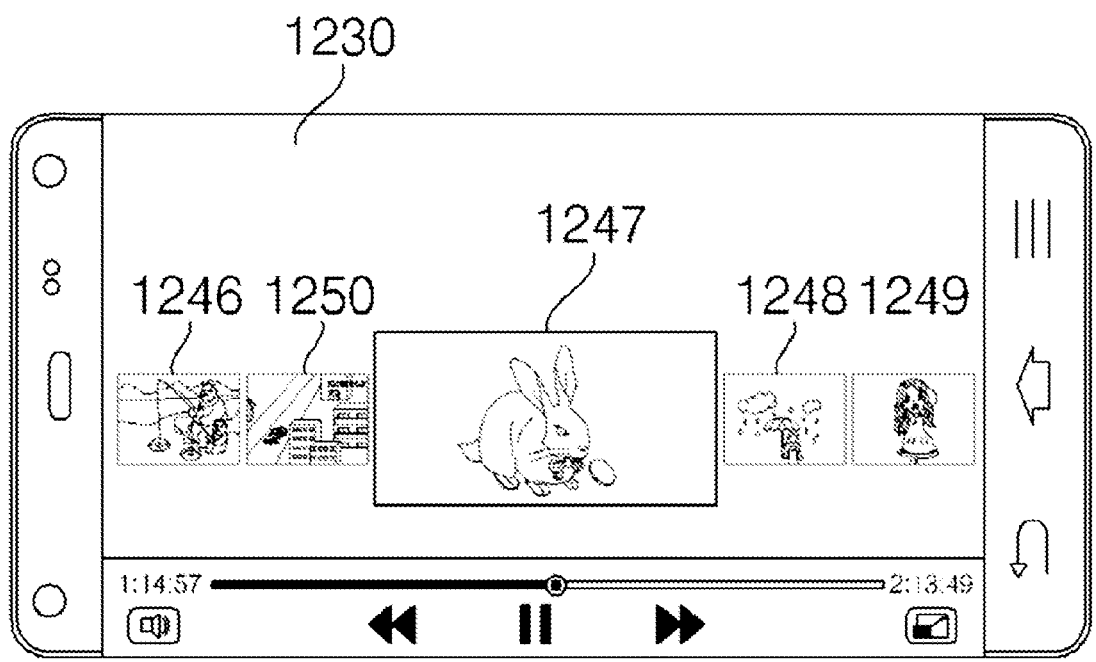

FIGS. 12A, 12B and 12C depict screens illustrating an operation for displaying thumbnail images of playable multimedia files in a state where playback of a first file has ended according to an embodiment of the present invention.

As illustrated in FIG. 12A, after completion of playback to the end of a first file, the controller 180 displays a screen 1210 at a point in time when playback of the first file ended on the display unit 151. In a state where playback of the first file has ended, the controller 180 receives a pinch-in input 1220.

Upon receiving the pinch-in input 1220, as exemplarily illustrated in FIG. 12B, the controller 180 displays a fourth retrieval screen 1230. Here, the fourth retrieval screen 1230 is a screen in which files to be played back via the multimedia application can be retrieved.

The controller 180 displays thumbnail images 1245 to 1248 corresponding to playable files in the fourth retrieval screen 1230. At this time, the controller 180 may display thumbnail images corresponding to respective playable files according to priority in a folder in which the first file is stored. Alternatively, in the case where the first file is part of a series, the controller 180 may display thumbnail images corresponding to the other files of the series based on names of the files. At this time, the number of the thumbnail images 1245 to 1248 displayed in the fourth retrieval screen 1230 may vary according to a setting. Alternatively, the thumbnail images may be limited to the number of thumbnail images that can be arranged in the fourth retrieval screen 1230.

Meanwhile, the controller 180 may display a thumbnail image 1250 of the first file that has completely played back in a region of the fourth retrieval screen 1230. At this time, the thumbnail image 1250 of the first file may be displayed in larger size than the other thumbnail images 1245 to 1248.

In a state where the thumbnail images 1245 to 1248 are displayed, the controller 180 receives a leftward or rightward flicking input 1225. Upon receiving the flicking input 1225, as illustrated in FIG. 12C the controller 180 moves and displays the thumbnail image 1250 corresponding to the first file in the direction of the flicking input 1225. Simultaneously, a fourth thumbnail image 1247 located at the right side of the thumbnail image 1250 corresponding to the first file is displayed at the center of the fourth retrieval screen 1230. At this time, the fourth thumbnail image 1247, displayed at the center of the fourth retrieval screen 1230, may be displayed in larger size than the other thumbnail images 1246, 1250, 1248 and 1249. Meanwhile, upon receiving a touch input to any one of the thumbnail images 1246, 1250, 1248 and 1249 displayed in the fourth retrieval screen 1230, the controller 180 plays back a multimedia file corresponding to the thumbnail image receiving the touch input.

Figure 13A:
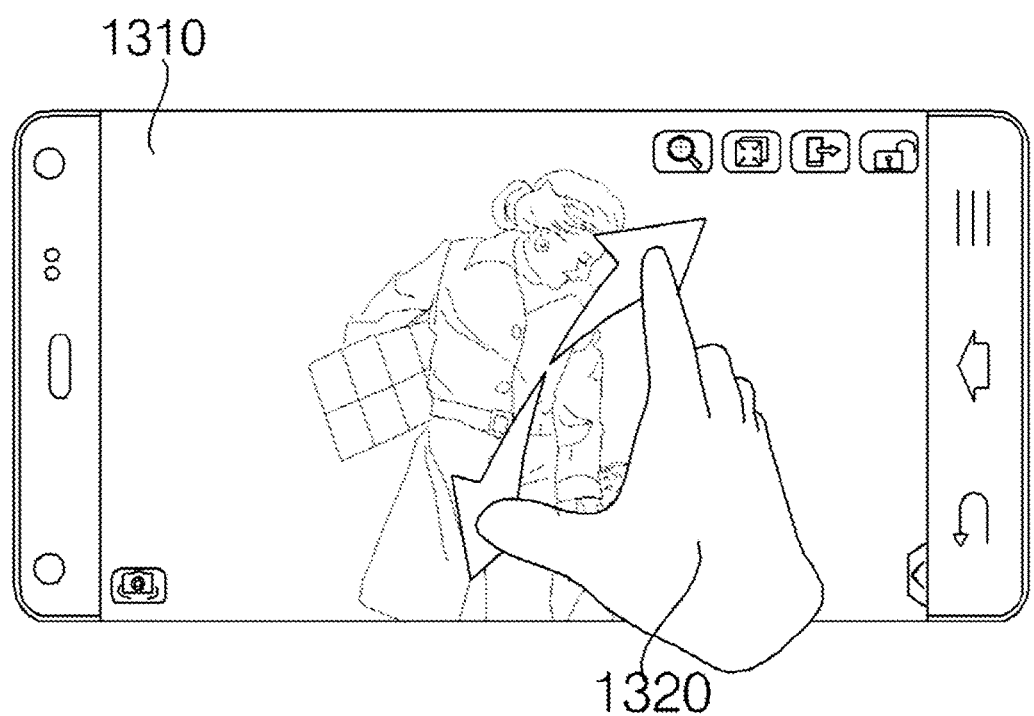
FIGS. 13A, 13B and 13C depict screens illustrating an operation for displaying a first progress bar for precise retrieval according to an embodiment of the present invention.
Figure 13B:
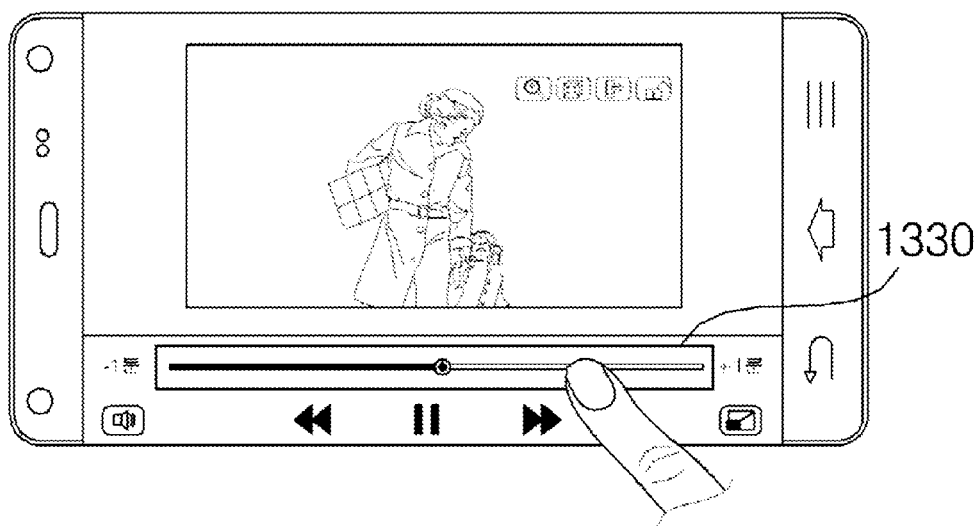
Figure 13C:
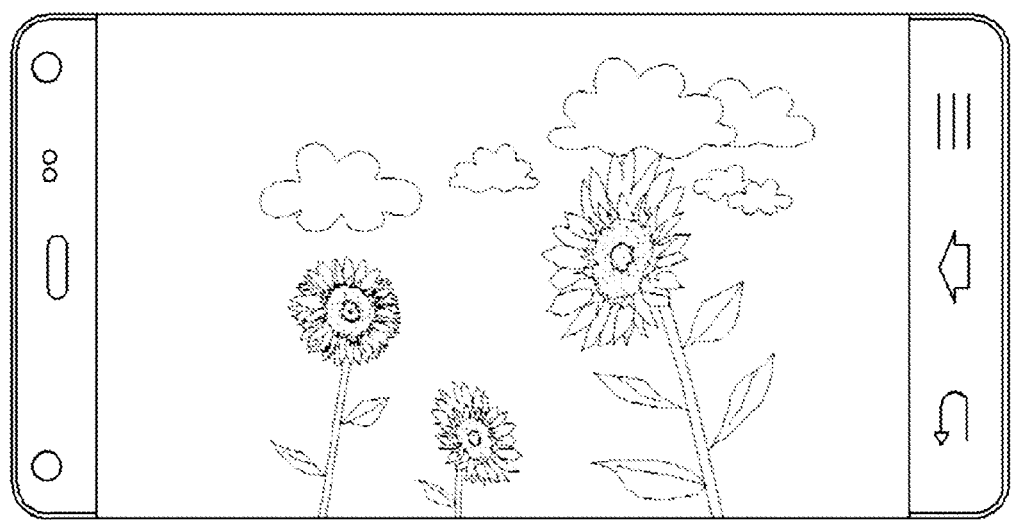

FIGS. 13A, 13B and 13C depict screens illustrating an operation for displaying a first progress bar for precise retrieval according to an embodiment of the present invention.

As exemplarily illustrated in FIG. 13A, the controller 180 plays back a selected first file. The controller 180 displays a playback screen 1310 of the first file on the display unit 151. In a state where the first file is being played back, the controller 180 receives a pinch-out input 1320.

Upon receiving the pinch-out input 1320, as exemplarily illustrated in FIG. 13B, the controller 180 displays a first progress bar 1330 corresponding to a first playback period.

The first playback period is a playback period corresponding to a shorter playback time than the overall playback time of the first file. For example, when the overall playback time of the first file is 120 minutes, the first playback period may be 10 minutes. That is, in the present embodiment, the first playback period may be a playback period from 5 minutes before a point in time when the pinch-out input is received to 5 minutes after the point in time when the pinch-out input is received.

The first progress bar 1330 is a progress bar that performs a function for retrieving the first file on a per playback time frame basis within a prescribed period (e.g., the first playback period) before and after a point in time when the pinch-out input is received. The first progress bar 1330 may be located in a region of the playback screen of the first file. In the present embodiment, the controller 180 displays the first progress bar 1330 at a center lower end of the playback screen 1310 of the first file.

In a state where the first progress bar 1330 is displayed, upon receiving a touch input to a 4 minutes later point of the first progress bar 1330, as exemplarily illustrated in FIG. 13C, the controller 180 plays back the first file at a playback point in time of 4 minutes later corresponding to the touch point.

FIGS. 14A, 14B, 14C and 14D depict screens illustrating an operation for displaying a second progress bar for precise retrieval according to an embodiment of the present invention.

Figure 14A:
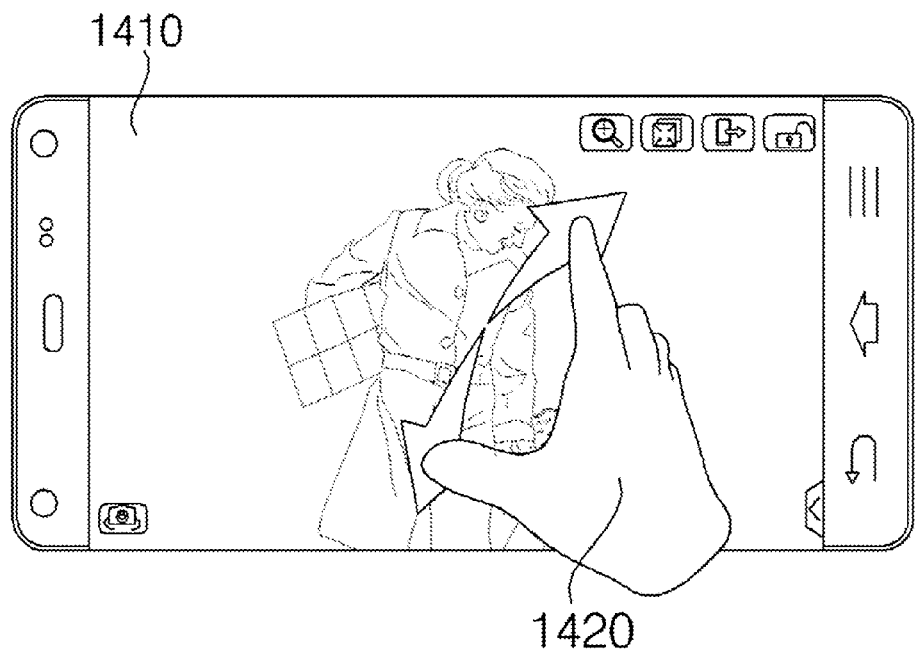
FIGS. 14A, 14B, 14C and 14D depict screens illustrating an operation for displaying a second progress bar for precise retrieval according to an embodiment of the present invention.

As exemplarily illustrated in FIG. 14A, the controller 180 plays back a selected first file. The controller 180 displays a playback screen 1410 of the first file on the display unit 151. In a state where the first file is being played back, the controller 180 receives a pinch-out input 1420.

Figure 14B:
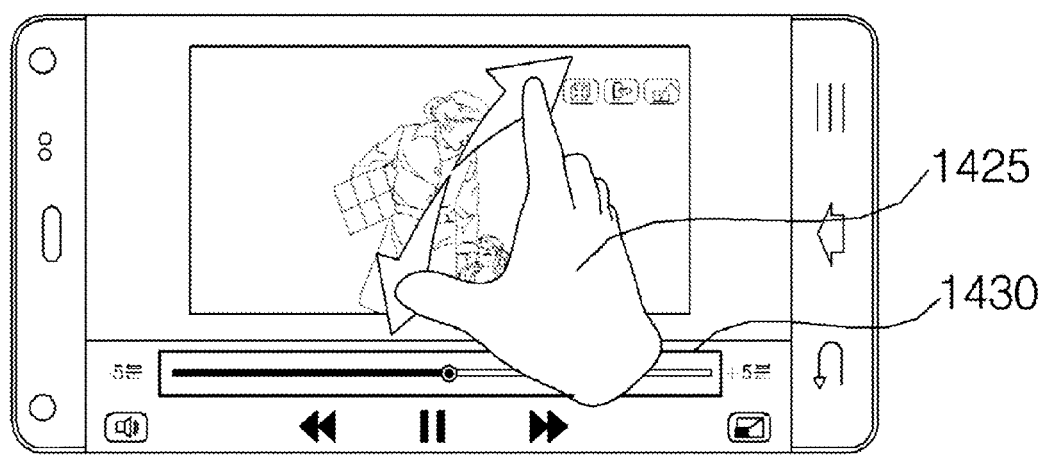

Upon receiving the pinch-out input 1420, as exemplarily illustrated in FIG. 14B, the controller 180 displays a first progress bar 1430 corresponding to a first playback period. The first playback period and the first progress bar have been described above with reference to FIGS. 13A, 13B and 13C.

In a state where the first progress bar 1430 is displayed, the controller 180 receives a pinch-out input 1425.

Figure 14C:
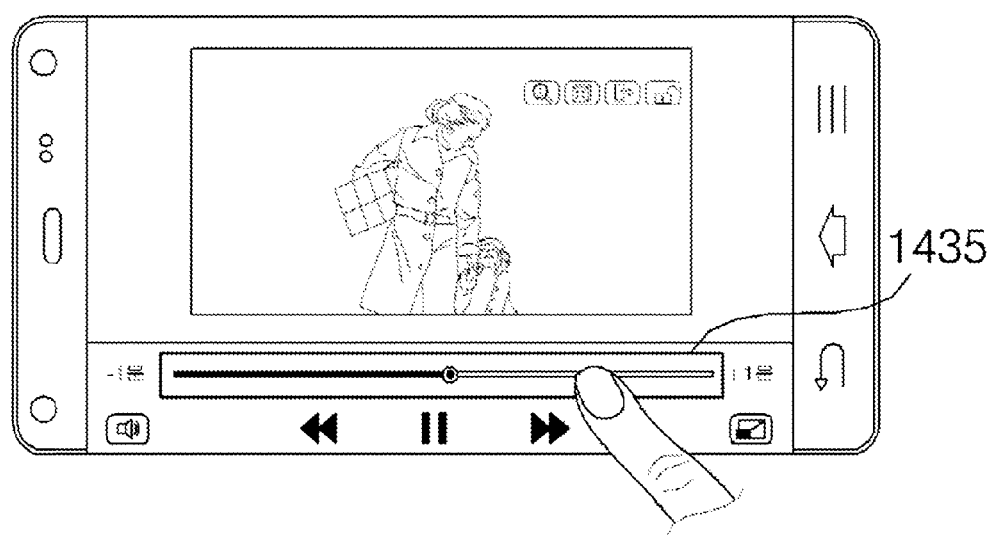

Upon receiving the pinch-out input 1425, as exemplarily illustrated in FIG. 14C, the controller 180 displays a second progress bar 1435 corresponding to a second playback period.

The second playback period is a playback period corresponding to a shorter playback time than a playback time of the first playback period. In the present embodiment, the playback time of the first playback period is 10 minutes and the playback time of the second playback period is 2 minutes. That is, in the present embodiment, the second playback period may be a playback period from 1 minute before a point in time when the pinch-out input is received to 1 minute after the point in time when the pinch-out input is received in a state where the first progress bar 1430 is displayed.

The second progress bar 1435 is a progress bar that performs a function for retrieving the first file on a per playback time frame basis within a prescribed period (i.e. the second playback period) before and after a point in time when the pinch-out input is received in a state where the first progress bar 1430 is displayed. The second progress bar 1435 may be located in a region of the playback screen of the first file. In the present embodiment, the controller 180 displays the second progress bar 1435 at a center lower end of the playback screen 1410 of the first file.

Figure 14D:
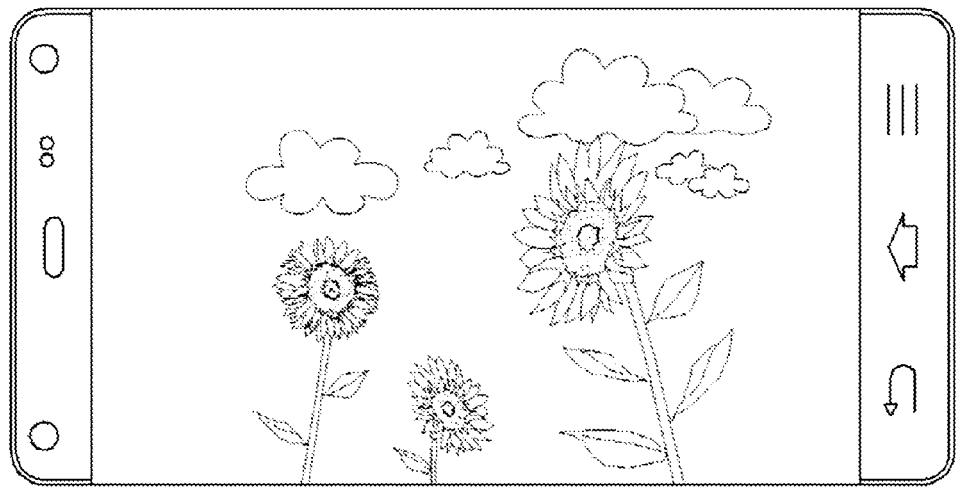

In a state where the second progress bar 1435 is displayed, upon receiving a touch input to a 30 seconds later point of the second progress bar 1435, as exemplarily illustrated in FIG. 14*d*, the controller 180 plays back the first file at a playback point in time of 30 seconds later corresponding to the touch point.

Figure 15A:
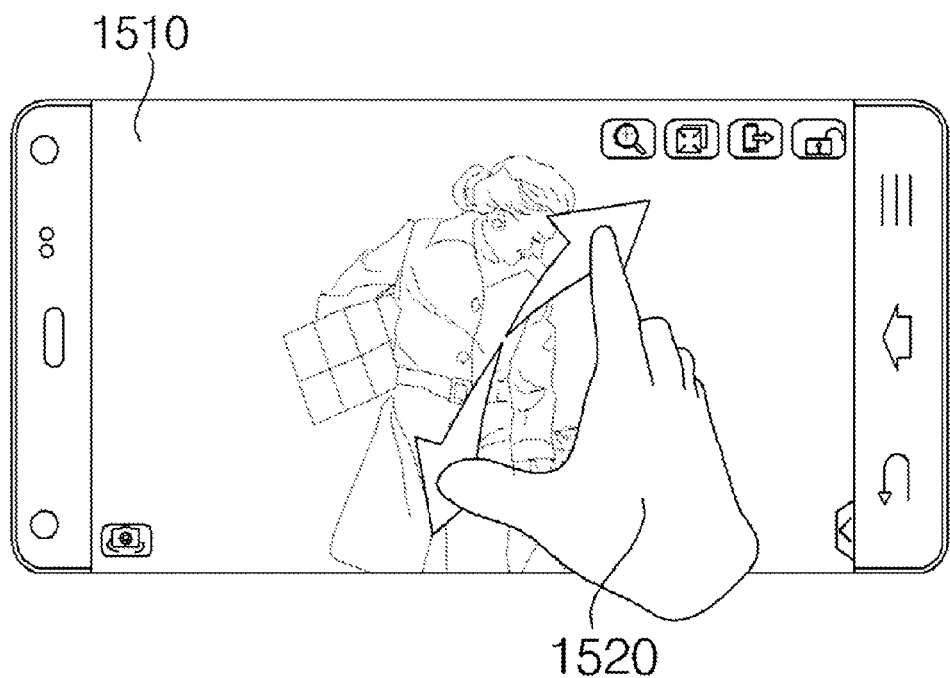
FIGS. 15A, 15B and 15C depict screens illustrating an operation for redisplaying a first file playback screen after displaying a first progress bar according to an embodiment of the present invention.
Figure 15B:
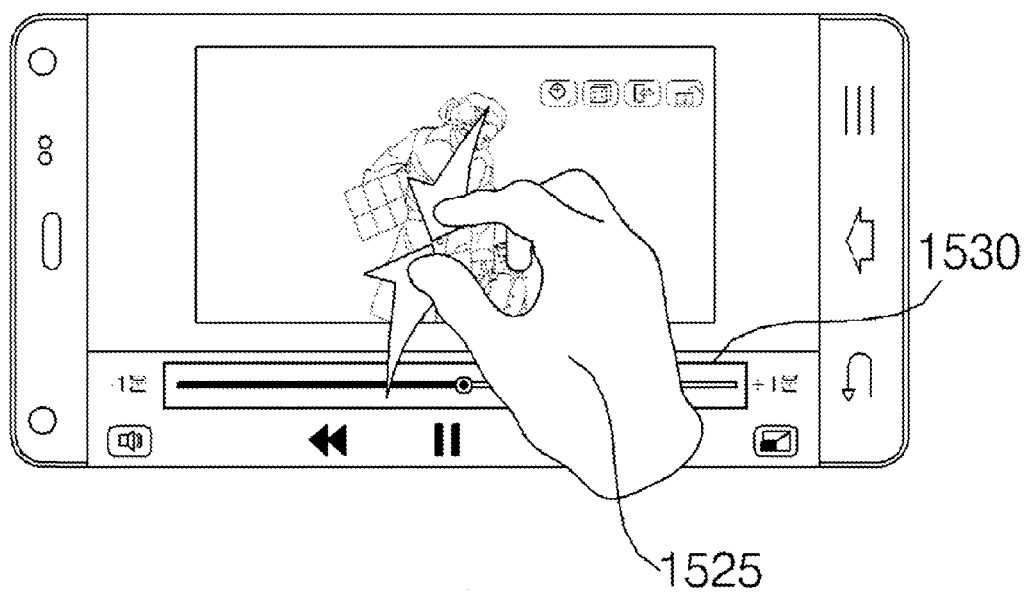
Figure 15C:
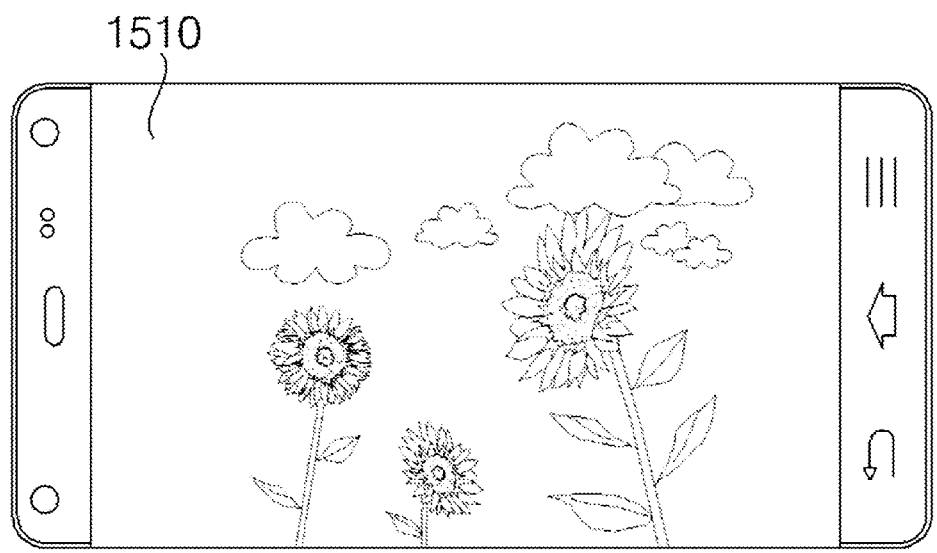

FIGS. 15A, 15B and 15C depict screens illustrating an operation for redisplaying a first file playback screen after displaying a first progress bar according to an embodiment of the present invention.

As exemplarily illustrated in FIG. 15A, the controller 180 plays back a selected first file. The controller 180 displays a playback screen 1510 of the first file on the display unit 151. In a state where the first file is being played back, the controller 180 receives a pinch-out input 1520.

Upon receiving the pinch-out input 1520, as exemplarily illustrated in FIG. 15B, the controller 180 displays a first progress bar 1530 corresponding to a first playback period. The first playback period and the first progress bar have been described above with reference to FIGS. 13A, 13*b* and 13C.

In a state where the first progress bar 1530 is displayed, the controller 180 receives a pinch-in input 1525. At this time, the pinch-in input 1525 is a touch input to display the playback screen of the first file in a state where the first progress bar 1530 is displayed.

Upon receiving the pinch-in input, as exemplarily illustrated in FIG. 15C, the controller 180 displays the playback screen 1510 of the first file on the display unit 151. At this time, the controller 180 no longer displays the first progress bar 1530.

FIGS. 16A, 16B, 16C, 16D and 16E depict screens illustrating an operation for setting a retrieval screen according to an embodiment of the present invention.

The present embodiment illustrates a setting operation in an executed state of the multimedia application, without being limited thereto. The controller may set a retrieval screen by a user input received after entering a setting mode.

Figure 16A:
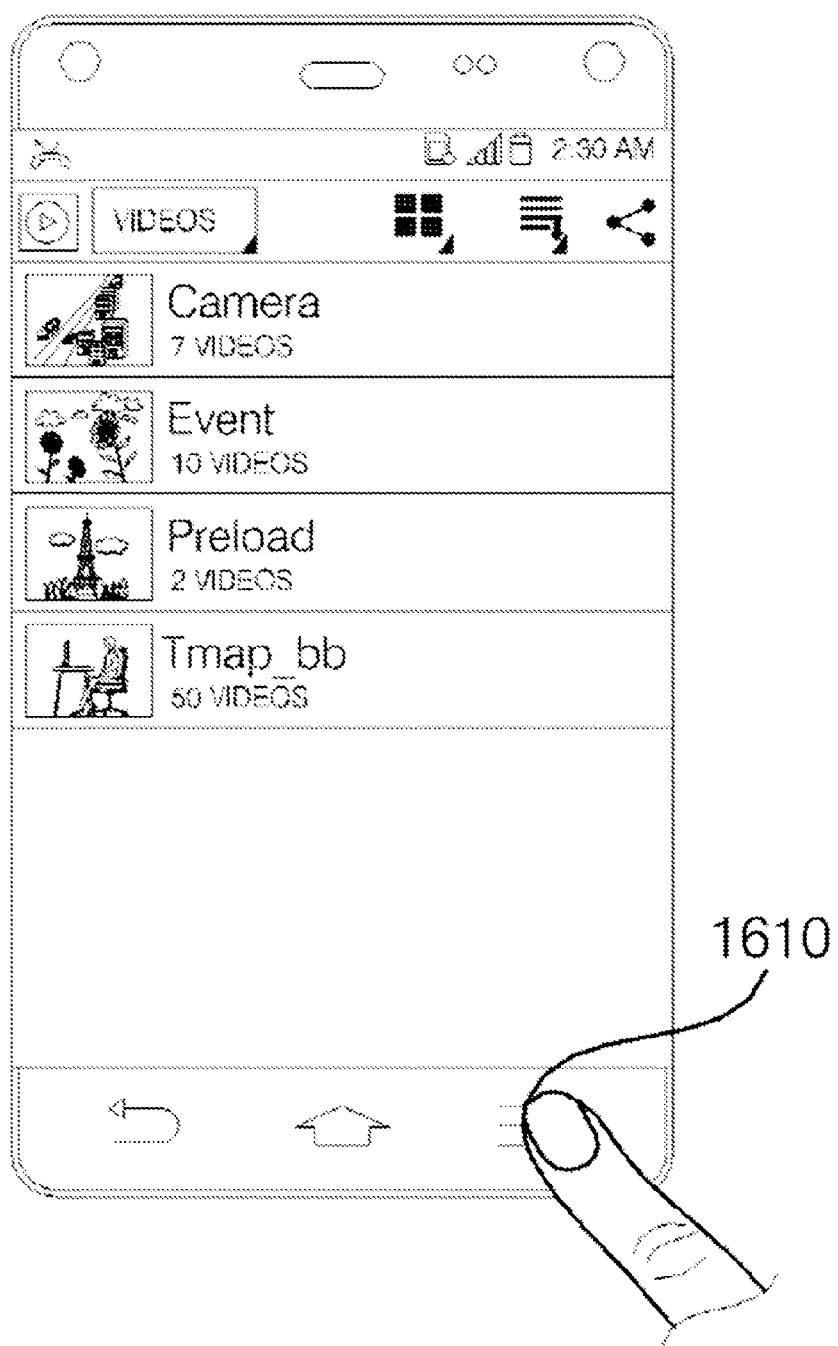

As exemplarily illustrated in FIG. 16A, in a state where the multimedia application is executed, the controller 180 receives a touch input to a menu button 1610.

Figure 16B:
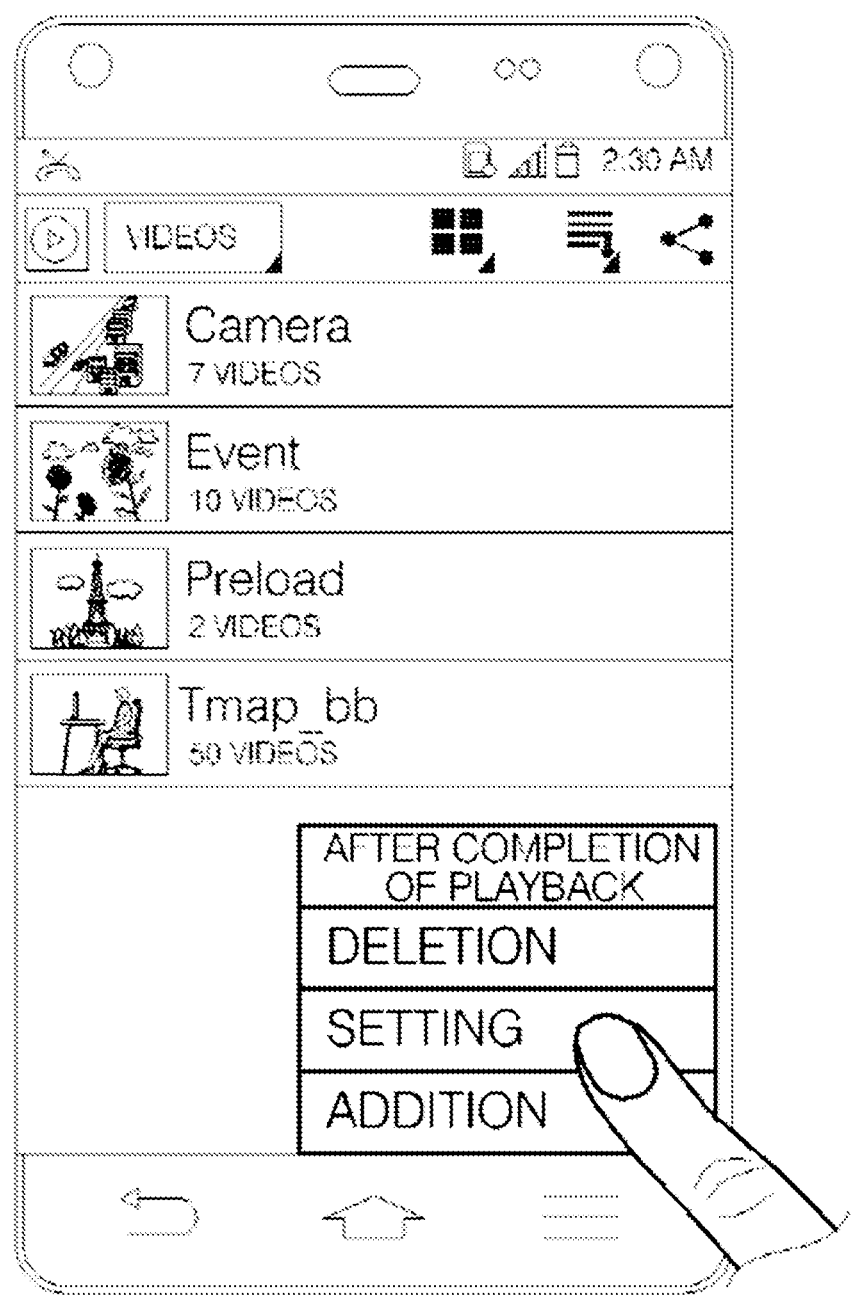

In this case, as exemplarily illustrated in FIG. 16B, the controller 180 displays one or more menu items with regard to the multimedia application. When a setting item among the menu items is selected, as exemplarily illustrated in FIG. 16C, the controller 180 displays a setting screen 1630. The setting screen 1630 includes a retrieval screen setting item 1631, a progress bar setting item 1632, and a playback setting item 1633.

Figure 16D:
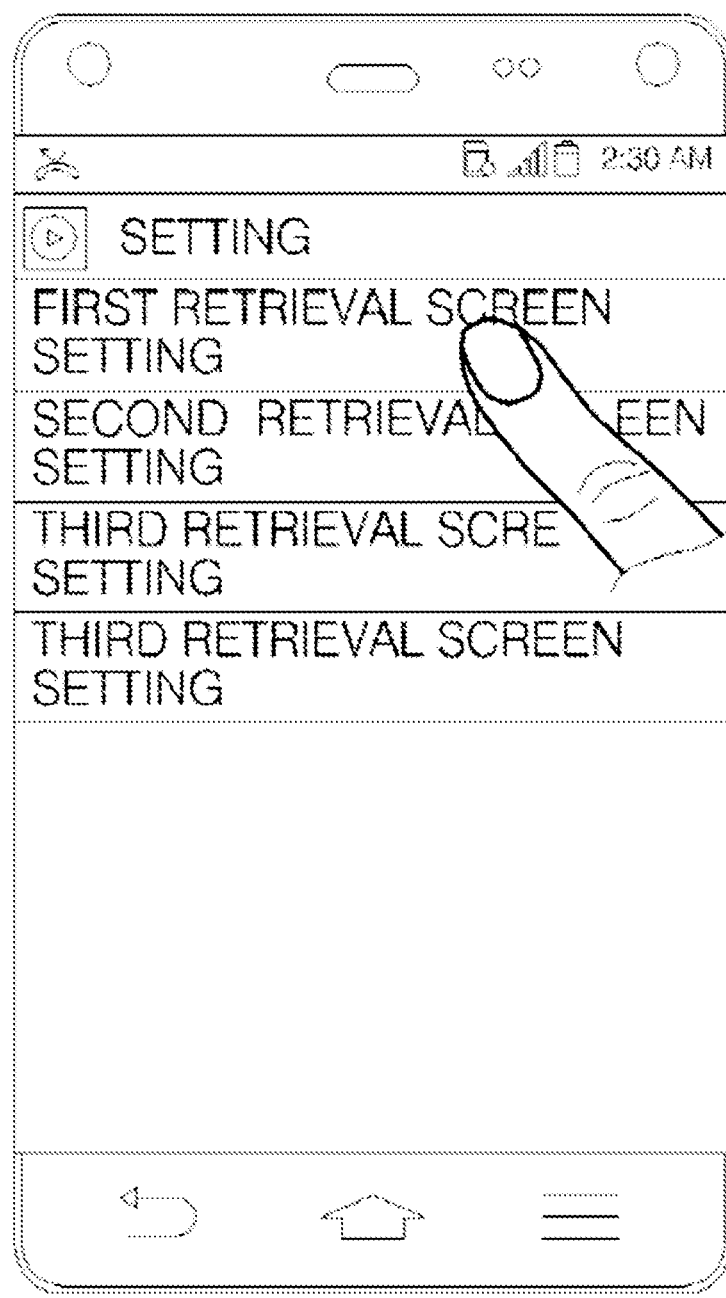

When the retrieval screen setting item 1631 is selected, as exemplarily illustrated in FIG. 16D, the controller 180 displays a first retrieval screen setting item to a fourth retrieval screen setting item.

Figure 16E:

When the first retrieval screen setting item is selected, as exemplarily illustrated in FIG. 16*e*, the controller 180 displays a first retrieval screen setting screen. Through the first retrieval screen setting screen, the user can set a first time interval. That is, the user can set a time interval between a plurality of thumbnail images included in a first retrieval screen.

Figure 17A:
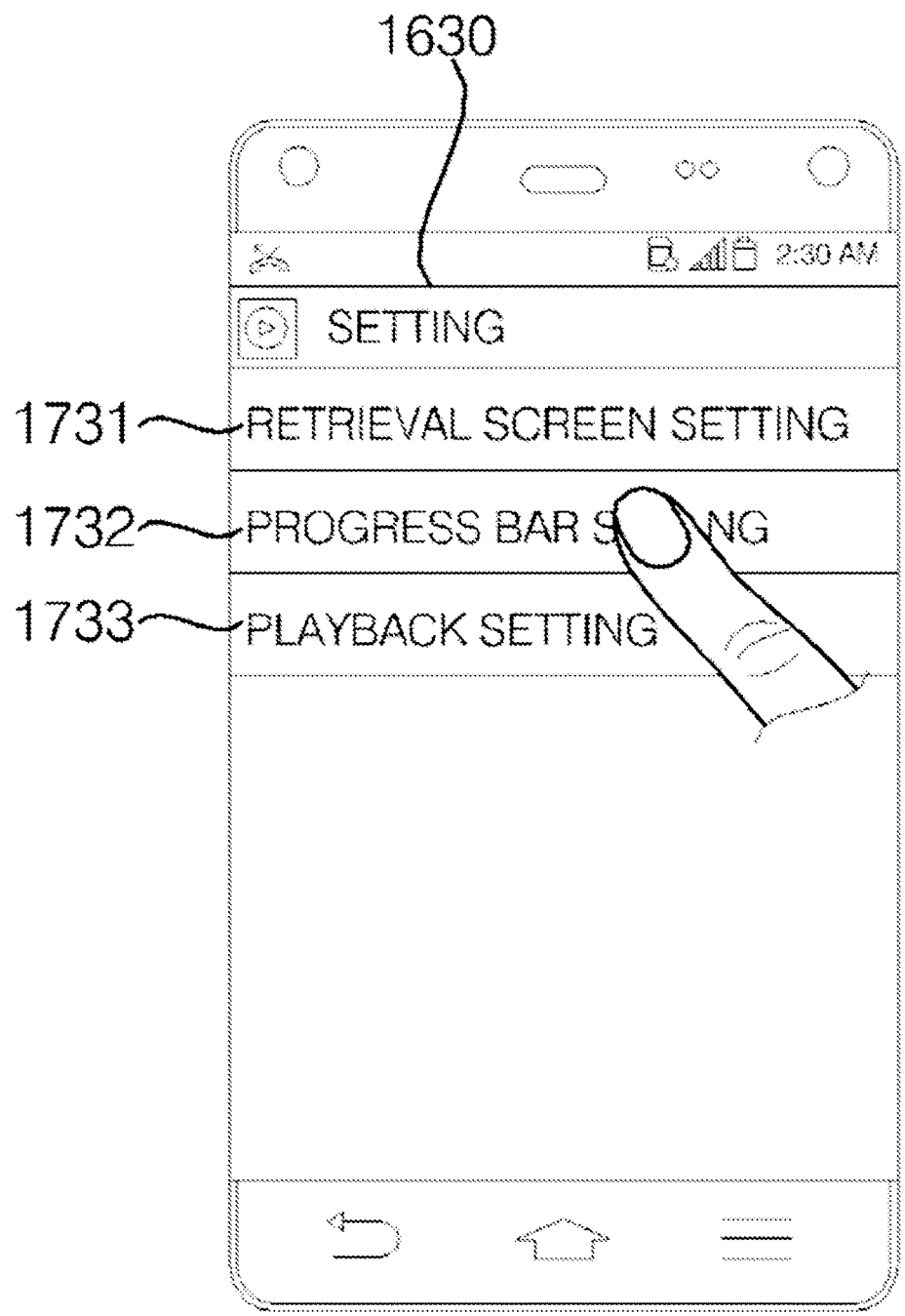
FIGS. 17A, 17B and 17C depict screens illustrating an operation for setting a playback period of a progress bar according to an embodiment of the present invention.
Figure 17B:
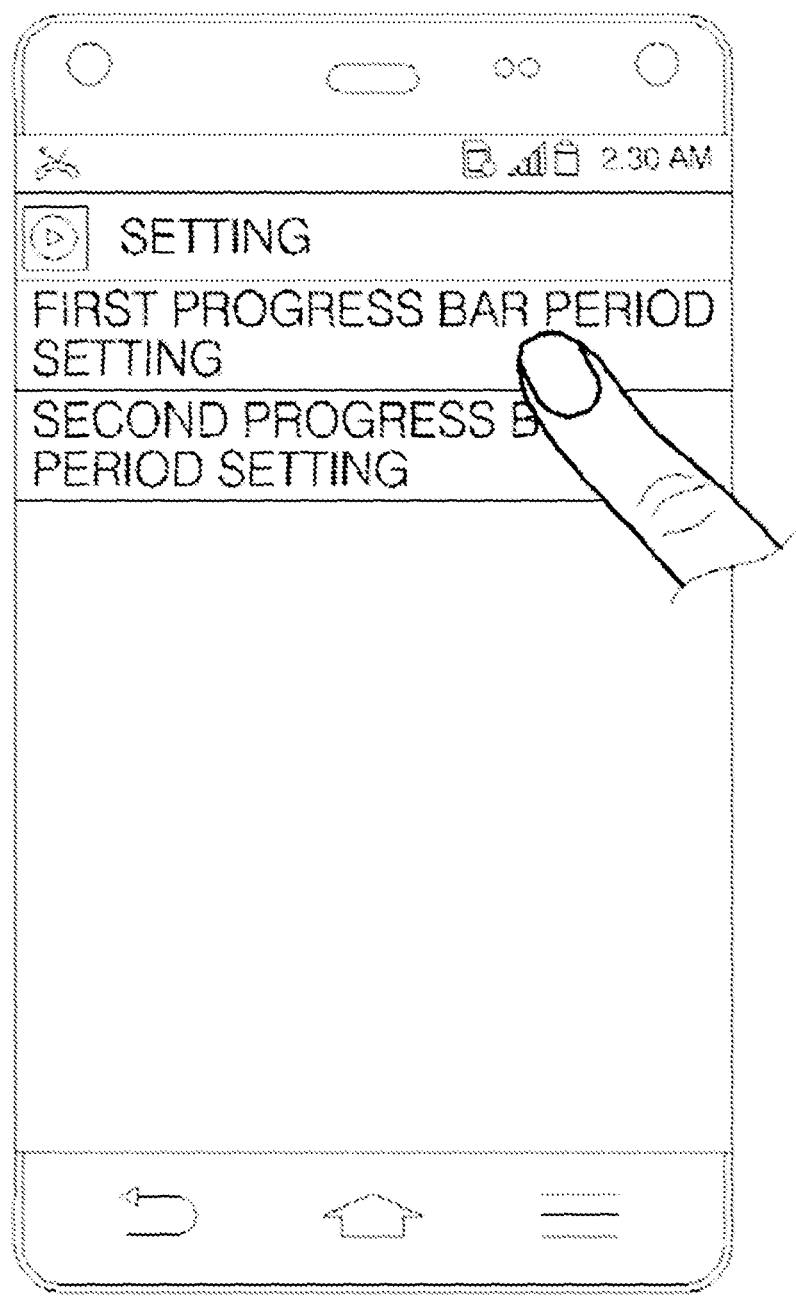
Figure 17C:
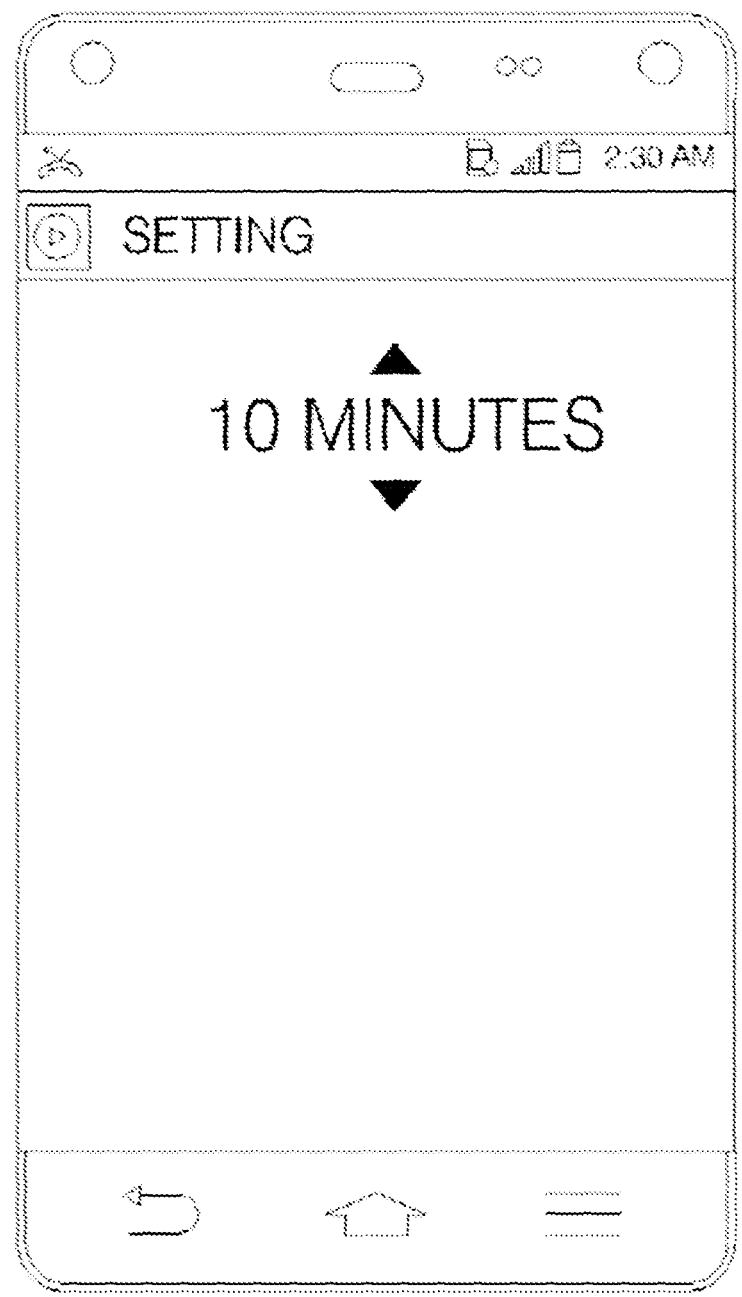

FIGS. 17A, 17B and 17C depict screens illustrating an operation for setting a playback period of a progress bar according to an embodiment of the present invention.

As exemplarily illustrated in FIG. 17A, the controller 180 displays a setting screen 1630.

When a progress bar setting item 1732 is selected, as exemplarily illustrated in FIG. 17B, the controller 180 displays a first progress bar period setting item and a second progress bar period setting item.

When the first progress bar period setting item is selected, as exemplarily illustrated in FIG. 17C, the controller 180 displays a first progress bar period setting screen. Through the first progress bar period setting screen, the user can set a time for a first playback period.

As is apparent from the above description, a mobile terminal and a control method thereof include assorted features, such as those presented below.

A first feature includes the effect of simply displaying a retrieval screen by a predetermined user input during playback of a multimedia file.

Second, by displaying a thumbnail image corresponding to a desired playback point in time in a retrieval screen, a further feature enables precise retrieval of a multimedia file having a long overall playback time.

Third, by displaying thumbnail images, corresponding to playback points in time, in a retrieval screen on a per user set time interval basis, yet another features includes an effect of increasing user convenience.

Fourth, by displaying, in a retrieval screen, a file that is being played back as well as thumbnail images corresponding to other playable files, one aspect includes the effect of simply playing back other files in addition to the file that is being played back.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a display; and
a controller configured to:
cause the display to display a playback screen of a first multimedia file;

cause the display to display a first retrieval screen in response to receiving a first user input during the displaying of the playback screen of the first multimedia file, wherein the first retrieval screen includes a plurality of thumbnail images respectively corresponding to one of a plurality of playback points in time on a per first time interval basis of the first multimedia file; and cause the display to play the first multimedia file beginning at a playback point in time that corresponds to a selected one of the plurality of thumbnail images, wherein the first retrieval screen further includes a reduced playback screen of the first multimedia file, wherein while the first multimedia file is being played in the reduced playback screen, the controller causes video for each of the thumbnail images to be displayed for a time corresponding to a playback time of the first multimedia file, wherein the controller is further configured to:

determine whether a remaining playback time of the first multimedia file is a reference time or less than the reference time on a basis of a point in time when the first user input is received; and cause the display to display a second retrieval screen when the remaining playback time of the first multimedia file meets the reference time or is less than the reference time, wherein the second retrieval screen includes thumbnail images corresponding to playback screens on a per second time interval basis and thumbnail images corresponding to the first multimedia file and other playable files.

2. The mobile terminal according to claim 1, wherein the playback points in time of a first plurality of the plurality of thumbnail images respectively correspond to points of time before the first user input is received, and wherein the playback points in time of a second plurality of the plurality of thumbnail images respectively correspond to points of time after the first user input is received.

3. The mobile terminal according to claim 1, wherein the plurality of thumbnail images each display a playback screen at a respective playback point in time on the per first time interval basis of the first multimedia file.

4. The mobile terminal according to claim 1, wherein the controller is further configured to:

cause the display to display a third retrieval screen in response to receiving a second user input, wherein the third retrieval screen is different from the first retrieval screen, and wherein the third retrieval screen includes a plurality of thumbnail images respectively corresponding to one of a plurality of playback points in time on a per third time interval basis of the first multimedia file; and cause the display to play the first multimedia file beginning at a playback point in time that corresponds to a selected one of the plurality of thumbnail images of the third retrieval screen.

5. The mobile terminal according to claim 4, wherein the third time interval is shorter than the first time interval.

6. The mobile terminal according to claim 1, wherein the controller is further configured to:

change a screen layout of the plurality of thumbnail images included in the first retrieval screen upon receiving a second user input at the first retrieval screen.

7. The mobile terminal according to claim 1, wherein the controller is configured to:

when any one of the thumbnail images included in the retrieval screen is selected, play back the first multimedia file at a playback point in time corresponding to the selected thumbnail image, or play back a second multimedia file corresponding to the selected thumbnail image.

8. The mobile terminal according to claim 1, wherein the first user input is a pinch-in input at the playback screen of the first multimedia file.

9. A method for controlling a mobile terminal having a display, the method comprising:

displaying on the display a playback screen of a first multimedia file;

displaying on the display a first retrieval screen in response to receiving a first user input during the displaying of the playback screen of the first multimedia file, wherein the first retrieval screen includes a plurality of thumbnail images respectively corresponding to one of a plurality of playback points in time on a per first time interval basis of the first multimedia file;

displaying on the display the first multimedia file beginning at a playback point in time that corresponds to a selected one of the plurality of thumbnail images;

determining whether a remaining playback time of the first multimedia file is a reference time or less than the reference time on a basis of a point in time when the first user input is received; and displaying on the display a retrieval screen when the remaining playback time of the first multimedia file meets the reference time or is less than the reference time, wherein the second retrieval screen includes thumbnail images corresponding to playback screens on a per second time interval basis and thumbnail images corresponding to the first multimedia file and other playable files;

wherein the first retrieval screen further includes a reduced playback screen of the first multimedia file, wherein the displaying on the display the first retrieval screen comprises while the first multimedia file is being played in the reduced playback screen, displaying video for each of the thumbnail images for a time corresponding to a playback time of the first multimedia file.

10. The method according to claim 9, wherein the playback points in time of a first plurality of the plurality of thumbnail images respectively correspond to points of time before the first user input is received, and wherein the playback points in time of a second plurality of the plurality of thumbnail images respectively correspond to points of time after the first user input is received.

11. The method according to claim 9, wherein the plurality of thumbnail images each display a playback screen at a respective playback point in time on the per first time interval basis of the first multimedia file.

12. The method according to claim 9, further comprising:

displaying on the display a third retrieval screen in response to receiving a second user input, wherein the third retrieval screen is different from the first retrieval screen, and wherein the third retrieval screen includes a plurality of thumbnail images respectively corresponding to one of a plurality of playback points in time on a per third time interval basis of the first multimedia file; and displaying on the display the first multimedia file beginning at a playback point in time that corresponds to a selected one of the plurality of thumbnail images of the third retrieval screen.

13. The method according to claim 12, wherein the third time interval is shorter than the first time interval.

14. The method according to claim 9, further comprising:
changing a screen layout of the plurality of thumbnail images included in the first retrieval screen upon receiving a second user input at the first retrieval screen.

15. The method according to claim 9, further comprising:
when any one of the thumbnail images included in the second retrieval screen is selected, playing back the first multimedia file at a playback point in time corresponding to the selected thumbnail image, or play back a second multimedia file corresponding to the selected thumbnail image.

16. The method according to claim 9, wherein the first user input is a pinch-in input at the playback screen of the first multimedia file.

17. The method according to claim 9, wherein the first time interval is set upon receiving a user input.

18. A method for controlling a mobile terminal having a display, the method comprising:
displaying on the display a playback screen of a first multimedia file;
displaying a first progress bar upon receiving a first user input at the playback screen of the first multimedia file, the first progress bar corresponding to a predetermined first playback period of a shorter playback time than an overall playback time of the first multimedia file; and
playing back the first multimedia file at a playback point in time corresponding to a touch point of a touch input received at a portion of the first progress bar;
determining whether a remaining playback time of the first multimedia file is a reference time or less than the reference time on a basis of a point in time when a first user input is received; and
displaying on the display a retrieval screen when the remaining playback time of the first multimedia file meets the reference time or is less than the reference time, wherein the retrieval screen includes thumbnail images corresponding to playback screens on a per time interval basis and thumbnail images corresponding to the first multimedia file and other playable files.

* * * * *